US009215686B2

(12) United States Patent
Kazmi et al.

(10) Patent No.: US 9,215,686 B2
(45) Date of Patent: Dec. 15, 2015

(54) WIRELESS DEVICE, MEASURING NODE, NETWORK NODE, METHODS THEREIN, COMPUTER PROGRAM, AND COMPUTER-READABLE STORAGE MEDIUM

(71) Applicant: Telefonaktiebolagel L M Ericsson (publ), Stockholm (SE)

(72) Inventors: Muhammad Kazmi, Bromma (SE); Robert Baldemair, Solna (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 150 days.

(21) Appl. No.: 14/235,586

(22) PCT Filed: Dec. 12, 2013

(86) PCT No.: PCT/SE2013/051503
§ 371 (c)(1),
(2) Date: Jan. 28, 2014

(87) PCT Pub. No.: WO2014/104961
PCT Pub. Date: Jul. 3, 2014

(65) Prior Publication Data
US 2015/0011236 A1    Jan. 8, 2015

Related U.S. Application Data

(60) Provisional application No. 61/746,582, filed on Dec. 28, 2012.

(51) Int. Cl.
*H04B 7/00* (2006.01)
*H04W 64/00* (2009.01)
(Continued)

(52) U.S. Cl.
CPC .............. *H04W 64/00* (2013.01); *G01S 5/0226* (2013.01); *H04B 17/27* (2015.01); *H04W 52/365* (2013.01); *H04B 7/0404* (2013.01); *H04B 7/0413* (2013.01); *H04B 7/0608* (2013.01); *H04W 52/146* (2013.01); *H04W 52/283* (2013.01); *H04W 52/367* (2013.01); *Y02B 60/50* (2013.01)

(58) Field of Classification Search
CPC ............ H04W 52/367; H04W 52/146; H04W 52/365; H04W 52/283; H04W 64/00
USPC .......... 455/522, 69, 68, 127.1, 500, 517, 445, 455/556.1–557, 426.1, 426.2, 550.1, 403, 455/422.1, 67.11, 571, 574, 343.1–343.5, 455/507, 512; 370/310, 328, 329, 252, 343
See application file for complete search history.

(56) References Cited

U.S. PATENT DOCUMENTS 7,260,415 B1 *  8/2007  Oh ................................ 455/522
8,768,402 B1 *  7/2014  Wingo et al. ................. 455/522

OTHER PUBLICATIONS

"3rd Generation Partnership Project; Technical Specification Group Radio Access Network; Evolved Universal Terrestrial Radio Access (E-UTRA); User Equipment (UE) radio transmission and reception"(Release 11); 3GPP TS 36.101; V11.2.0 (Sep. 2012).

(Continued)

*Primary Examiner* — Keith Ferguson
(74) *Attorney, Agent, or Firm* — Baker Botts, LLP

(57) ABSTRACT

Embodiments herein relate to a method in a wireless device (10) for performing a positioning measurement procedure in a radio communications network, which positioning measurement procedure is performed using at least uplink transmitted signals from the wireless device (10). The wireless device (10) obtains information related to a maximum power reduction applied, or a maximum power reduction expected to be applied on uplink signals transmitted from the wireless device (10), which uplink signals are used for performing at least one positioning measurement. The wireless device (10) further takes the maximum power reduction applied, or the maximum power reduction expected to be applied into account when performing the positioning measurement procedure related to the at least one positioning measurement and/or a radio transmission procedure involving uplink radio signals transmitted by the wireless device (10) to enhance positioning measurement performance of the positioning measurement procedure.

28 Claims, 11 Drawing Sheets

(51) Int. Cl.
*H04W 52/36* (2009.01)
*H04B 17/27* (2015.01)
*G01S 5/02* (2010.01)
*H04W 52/14* (2009.01)
*H04W 52/28* (2009.01)
*H04B 7/04* (2006.01)
*H04B 7/06* (2006.01)

(56) References Cited

OTHER PUBLICATIONS

"3rd Generation Partnership Project; Technical Specification Group Radio Access Network; User Equipment (UE) radio transmision and reception (FDD)" (Release 11); 3GPP TS 25.101; V11.3.0 (Sep. 2012).

PCT Notification of Transmittal of the International Search Report and the Written Opinion of the International Searching Authority, or the Declaration for International application No. PCT/SE2013/051503.

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11).

* cited by examiner

WIRELESS DEVICE, MEASURING NODE, NETWORK NODE, METHODS THEREIN, COMPUTER PROGRAM, AND COMPUTER-READABLE STORAGE MEDIUM

PRIORITY

This nonprovisional application is a U.S. National Stage Filing under 35 U.S.C. §371 of International Patent Application Serial No. PCT/SE2013/051503, filed Dec. 12, 2013 and entitled "Wireless Device, Measuring Node, Network Node, Methods Therein, Computer Program, and Computer-Readable Storage Medium."

TECHNICAL FIELD

Embodiments herein relate to a wireless device, a measuring node, a network node, methods therein, a computer program, and a computer-readable storage medium. In particular, embodiments herein relate to performing a positioning measurement and/or enabling a positioning measurement.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments (UE) are served in the cells by the respective radio base station and are communicating with respective radio base station. The user equipments transmit data over a radio interface to the radio base stations in uplink (UL) transmissions and the radio base stations transmit data to the user equipments in downlink (DL) transmissions.

The possibility of identifying a geographical location of a user equipment in the radio communications network has enabled a large variety of commercial and non-commercial services, e.g., navigation assistance, social networking, location-aware advertising, emergency calls, etc. Different services may have different positioning accuracy requirements imposed by the positioning application. In addition, some regulatory requirements on the positioning accuracy for basic emergency services exist in some countries, e.g. 300 meters in Federal Communications Commission (FCC) Enhanced 9-1-1 in United States.

Positioning Overview

Several positioning methods for determining the location of a target device, which can be any of the wireless device or UE, mobile relay, Personal Digital Assistant (PDA), smartphone, wireless device for machine type communication, aka machine to machine communication, laptop mounting wireless devices or equipment, etc exist. The position of the target device is determined by using one or more positioning measurements, which can be performed by a suitable measuring node or the target device. Depending upon the positioning method used the measuring node can either be the target device itself, a separate radio node, i.e. a standalone node, serving and/or neighboring nodes of the target device etc. Also depending upon the positioning method the measurements can be performed by one or more types of measuring nodes.

The LTE architecture explicitly supports location services, e.g. see FIG. 1, by defining the Evolved Serving Mobile Location Center (E-SMLC) that is connected to the core network, i.e. Mobility Management Entity (MME) via the so called Location Service-Application Protocol (LCS-AP) interface and the Gateway Mobile Location Center (GMLC) that is connected to the MME via the standardized Lg interface. The LTE system supports a range of methods to locate the position of the target devices, e.g. UEs, within the coverage area of the Radio Access Network (RAN). These methods differ in accuracy and availability. Typically, satellite based methods, such as Assisted Global Navigation Satellite System (GNSS), are accurate with a (few) meter(s) of resolution, but may not be available in indoor environments. On the other hand, Cell Identity (ID) based methods are much less accurate, but have high availability. Therefore, LTE uses Assisted-Global Positioning System (A-GPS) as the primary method for positioning, while Cell-ID and Observed Time Difference of Arrival (OTDOA) based schemes serve as fall-back methods.

In LTE the positioning node, aka Evolved Serving Mobile Location Center (E-SMLC) or location server, configures the target device, e.g. UE, eNode B or a radio node dedicated for positioning measurements, e.g. location measurement unit (LMU), to perform one or more positioning measurements depending upon the positioning method. The positioning measurements are used by the target device or by a measuring node or by the positioning node to determine the location of the target device. In LTE the positioning node communicates with UE using LTE positioning protocol (LPP) and with eNode B using LTE positioning protocol annex (LPPa).

The well-known positioning methods used in cellular systems, e.g. LTE, are described below:

Satellite based methods: In this case the positioning measurements are performed by the target device on signals received from the navigational satellites are used for determining the target device's location. For example either GNSS or A-GNSS, e.g. A-GPS, Galileo, COMPASS, Galileo and Additional Navigation Satellite System (GANSS) etc, measurements are used for determining the UE position. In A-GNSS the location or positioning server provides assistance data to the target device enabling it to perform measurements on the received GNSS signals with greater precision and faster. In target device based A-GNSS method, UE based A-GNSS, the target device performs the A-GNSS measurements by using the received assistance information and also determines its location itself, On the other hand in case of target device assisted A-GNSS method, aka UE assisted A-GNSS, the target device performs the A-GNSS measurements by using the received assistance information and signals the A-GNSS measurement results to the positioning server, which is E-SMLC in LTE. The positioning server uses these received A-GNSS measurements to determine the location of the target device.

OTDOA: This method uses UE measurements related to time difference of arrival of signals from radio nodes, e.g. Reference Signal received Time Difference (RSTD) measurement in LTE, for determining UE position in LTE or SFN-SFN type 2 in High Speed Packet Access (HSPA). To speed up OTDOA measurements and also to improve their accuracy, the positioning server provides OTDOA assistance information to the target device. The OTDOA can also be UE based or UE assisted positioning method. In the former the target device determines its location itself whereas in the latter the positioning server, e.g. E-SMLC, uses the received OTDOA measurements from the target device to determine the location of the target device.

Uplink-Time Difference of Arrival (UTDOA): It uses measurements done at a measuring node, e.g. LMU, on signals transmitted by the target device. The LMU measurements from multiple LMUs are used by the location server, e.g. E-SMLC in LTE, for determining the position of the target device.

Enhanced cell ID (E-CID): It uses one or more radio measurements for determining the target device's position. The E-CID method uses at least the cell ID of a serving and/or a neighboring cell and at least one additional radio measurements which can be performed by the target device or by a radio node. For example E-CID method typically uses any combination of cell ID and radio measurements such as UE Receiver (Rx)-Transmitter (Tx) time difference, Base Station (BS) Rx-Tx time difference, Timing Advanced (TA) measured by the BS, LTE Reference Signal Received Power (RSRP) and/or Reference Signal Received Quality (RSRQ), HSPA Common Pilot Channel (CPICH) measurements, e.g. CPICH Received Signal Code Power (RSCP) and/or CPICH Ec/No), Angle of Arrival (AoA) measured by the BS on UE transmitted signals etc for determining the position of the target device. Ec/No is defined as received energy per chip (Ec) of the pilot channel divided by the total noise power density (No). The TA measurement is done using either UE Rx-Tx time difference or BS Rx-Tx time difference or both. Typically the location server uses several methods to determine the position of the target device. The E-CID positioning can also be target device assisted method or target device assisted method.

Hybrid methods: It relies on positioning measurements related to more than one positioning methods for determining the position of the target device. For example the hybrid method may use A-GNSS measurements and OTDOA RSTD measurements for determining the position of the target device. The hybrid method improves the overall accuracy of the position compared to that obtained based on an individual method.

Positioning Architecture in LTE

The three key network elements in an LTE positioning architecture are the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may also reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or a network node or external client.

Position calculation can be conducted, for example, by a positioning server, e.g. E-SMLC or SUPL Location Platform (SLP) in LTE, where SUPL stands for Secure User Plane Location, or UE. The former approach corresponds to the UE-assisted positioning mode, whilst the latter corresponds to the UE-based positioning mode.

Two positioning protocols operating via the radio network exist in LTE, LPP and LPPa. The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobile Alliance (OMA) LPP extensions (LPPe) are being specified to allow e.g. for operator-specific assistance data or assistance data that cannot be provided with LPP or to support other position reporting formats or new positioning methods.

A high-level architecture, as it is currently standardized in LTE, is illustrated in FIG. 1 also discussed above, where the LCS target is a terminal, and the LCS Server is an E-SMLC or an SLP. In the figure, the control plane positioning protocols with E-SMLC as the terminating point are shown, and the user plane positioning protocol is shown. SLP may comprise two components, SUPL Positioning Center (SPC) and SUPL Location Center (SLC) (not shown), which may also reside in different nodes. In an example implementation, SPC has a proprietary interface with E-SMLC, and Lip interface with SLC, and the SLC part of SLP communicates with PDN-Gateway (P-GW) and External LCS Client. PDN stands for Packet Data Network. The P-GW is further connected over the Si interface to the RAN via a Serving Gateway (S-GW).

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

For UL positioning, e.g., UTDOA, also LMUs may be comprised in the positioning architecture, see FIG. 2. The LMUs may be as shown, e.g., standalone, integrated into eNodeB (eNB) or co-sited with eNB. Hence, as shown in FIG. 2, the LMU may be an integrated LMU, a standalone LMU interfacing eNB or LMU sharing eNB antenna, or a standalone LMU with own radio equipment. In LTE, UTDOA measurements, Uplink Relative Time of Arrival (UL RTOA), are performed on Sounding Reference Signals (SRS). To detect an SRS signal, LMU needs a number of SRS parameters to generate the SRS sequence which is to be correlated to receive signals. SRS parameters would have to be provided in the assistance data transmitted by positioning node to LMU; these assistance data would be provided via protocol LMUp from the E-SMLC. However, these parameters are generally not known to the positioning node, which needs then to obtain this information from eNodeB configuring the SRS to be transmitted by the UE and measured by LMU; this information would have to be provided in LPPa or similar protocol Uplink Multi-antenna Transmission Uplink Multiple Input Multiple Output (MIMO) and uplink transmit diversity are both example of uplink multi-antenna transmission schemes. In both cases the UE transmits uplink signals with more than one transmit antenna.

In LTE different uplink multi-antenna transmissions techniques can be applied in the uplink; for example beamforming or antenna switching. The scheme can also be open loop or closed loop. Open loop uplink multi-antenna techniques are based on the assumption that the UE does not have information about the uplink channel, hence it cannot exploit this knowledge in order to optimize the transmission weights, the transmission beamforming, in order to steer the beam in the direction of the base station. On the contrary, in case of closed loop multi-antenna techniques the UE has some information about the uplink channel which exploits in order to optimize the beamforming vector.

The uplink transmit diversity can also be regarded as a special case of uplink MIMO transmission scheme.

In any MIMO or transmit diversity scheme, a set of parameters related to MIMO or uplink transmit diversity are regularly adjusted by the UE. The objective is to ensure that the uplink transmission incorporates the desired spatial, temporal or angular diversities. This in turns improves uplink coverage, reduces interference, increases uplink bit rate and enables UE to lower its transmitted power.

The MIMO or transmit diversity parameters comprise of: relative phase, relative amplitude, relative power, relative frequency, timing, absolute or total power of signals transmitted on transmit diversity branches, etc. The adjustment of all or a sub-set of these parameters is fundamental to transmit beamforming scheme. The objective of beamforming is to direct the uplink transmission or beam towards the desired base station, which is generally the serving base station. This allows the serving base station to easily decode the received signal more easily. Furthermore, high directivity of the beam towards the desired base station reduces the interference towards the neighboring base stations. Similarly in case of switched antenna transmit diversity, transmit diversity parameter implies the selection of the most appropriate transmit antenna, e.g. in terms of radio condition, out of the available transmit diversity branches. By the virtue of using the most appropriate antenna for the uplink transmission, the UE can either reduce its power while retaining a given uplink information rate, or increase the information rate while retaining a given output power.

In open loop MIMO or transmit diversity schemes, the UE autonomously adjusts the uplink transmit diversity parameters without the use of any network transmitted control signaling or commands. These schemes are simpler, although they may not show substantial gain in all scenarios.

In case of beamforming the UE typically uses one Power Amplifier (PA) per transmit antennas. The maximum output power of each PA used for an antenna can be scaled, e.g. lowered, by the number of transmit antenna. For example a UE with 2×2 UL MIMO may limit the maximum output power of 21 dBm for each of the two PA, e.g. vs. 23 dBm with 1 transmit antenna, when operating with beamforming i.e. when transmitting with both antennas at the same time to steer the uplink transmitted beam.

Multi-Carrier or Carrier Aggregation

To enhance peak-rates within a technology, multi-carrier or carrier aggregation solutions are known. For example, it is possible to use multiple 5 MHz carriers in HSPA to enhance the peak-rate within the HSPA network. Similarly in LTE for example multiple 20 MHz carriers or even smaller carriers, e.g. 5 MHz, can be aggregated in the UL and/or on DL. Each carrier in multi-carrier or carrier aggregation system is generally termed as a component carrier (CC) or sometimes is also referred to a cell. In simple words the CC means an individual carrier in a multi-carrier system. The term carrier aggregation (CA) is also called, (e.g. interchangeably called, "multi-carrier system", "multi-cell operation", "multi-carrier operation", "multi-carrier" transmission and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The primary CC, aka PCC or PCell, exists in both uplink and downlink directions in CA. In case there is single UL CC the PCell is obviously on that CC. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as Primary cell (PCell) or Primary Serving Cell (PSC). Similarly the secondary serving cell is interchangeably called as Secondary cell (SCell) or Secondary Serving Cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band, aka intra-band CA, or to different frequency band, inter-band CA, or any combination thereof, e.g. 2 CCs in band A and 1 CC in band B. The inter-band CA comprising of carriers distributed over two bands is also called as dual-band-dual-carrier-High Speed Downlink Packet Access (DB-DC-HSDPA) in HSPA or inter-band CA in LTE. Furthermore the CCs in infra-band CA may be adjacent or non-adjacent in frequency domain, aka intra-band non-contiguous CA. A hybrid CA comprising of intra-band adjacent, intra-band non-adjacent and inter-band is also possible. Using carrier aggregation between carriers of different technologies is also referred to as "multi-Radio Access Technology (RAT) carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described can be regarded as 'intra-RAT' or simply 'single RAT' carrier aggregation.

The multi-carrier operation may also be used in conjunction with multi-antenna transmission. For example signals on each CC may be transmitted by the eNB to the UE over two or more antennas.

The CCs in CA may or may not be co-located in the same site or base station or radio network node (e.g. relay, mobile relay etc). For instance the CCs may originate (i.e. transmitted/received) at different locations, e.g. from non-located BS or from BS and remote radio head (RRH) or remote radio units (RRU). The well-known examples of combined CA and multi-point communication are Distributed Antenna System (DAS), RRH, RRU, with Coordinated Multipoint (CoMP), multi-point transmission/reception etc.

Several existing positioning measurements are performed by the wireless devices, e.g. UE, target device etc, and/or measuring node, e.g. BS, LMU, etc, on signals transmitted by the wireless device. Some of these positioning measurements are only performed on UL transmitted signals e.g. Angle of Arrival, AoA, performed by the BS, UL RTOA performed by LMU etc, Some of these positioning measurements are performed on both DL and UL transmitted signals e.g. BS Rx-Tx time difference measurement, UE Rx-Tx time difference measurement, timing advance (TA), Round Trip Time (RTT), etc. In some cases, the performance of a positioning may be degraded when performed by a measuring node which is far from the UE location. This will lead to an inaccurate positioning measurement, which eventually degrades the positioning accuracy of UE location based on one or more of these positioning measurements.

SUMMARY

An object of embodiments herein is to provide a mechanism that positions the wireless device in an efficient, and accurate or reliable manner.

According to an aspect the object is achieved by a method in a wireless device for performing a positioning measurement procedure in a radio communications network. The positioning measurement procedure is performed using at least uplink transmitted signals from the wireless device. The wireless device obtains information related to a maximum power reduction applied, or a maximum power reduction expected to be applied on uplink signals transmitted from the wireless device. The uplink signals are used for performing at least one positioning measurement. The wireless device takes the maximum power reduction applied, or the maximum power reduction expected to be applied into account when performing the positioning measurement procedure related to the at least one positioning measurement and/or a radio transmission procedure involving uplink radio signals transmitted by the wireless device to enhance positioning measurement performance of the positioning measurement procedure.

According to another aspect the object is achieved by a method in a network node for enabling positioning of a wireless device and/or configuring the wireless device and/or a measuring node for performing a positioning measurement. The network node obtains information related to a maximum power reduction applied, or a maximum power reduction expected to be applied on uplink signals transmitted by the wireless device. The uplink signals are used by the wireless device and/or measurement node for performing at least one positioning measurement. The network node adapts at least one positioning measurement procedure related to the at least one positioning measurement, based on the maximum power reduction applied, or the maximum power reduction expected to be applied, to enhance positioning performance. The adaptation comprises one or more of:

adapting parameters related to the at least one positioning measurement using uplink signals transmitted by the wireless device; switching to a positioning method which does not require a measurement on uplink signals transmitted by the wireless device; and discarding a positioning measurement that use uplink signals transmitted by the wireless device.

According to yet another aspect the object is achieved by a method in a measuring node for performing a positioning measurement on at least uplink signals transmitted by a wireless device. The measuring node obtains information related to a maximum power reduction applied, or a maximum power reduction expected to be applied on uplink signals transmitted by the wireless device. The uplink signals are used by the measuring node for performing at least one positioning measurement. The measuring node adapts at least one positioning measurement procedure related to the at least one positioning measurement to enhance positioning performance, based on the maximum power reduction applied, or the maximum power reduction expected to be applied.

According to still another aspect the object is achieved by a wireless device for performing a positioning measurement procedure in a radio communications network. The positioning measurement procedure is performed using at least uplink transmitted signals from the wireless device. The wireless device comprises processing means being configured to obtain information related to a maximum power reduction applied, or a maximum power reduction expected to be applied on uplink signals transmitted from the wireless device, which uplink signals are used for performing at least one positioning measurement. The processing means further being configured to take the maximum power reduction applied, or the maximum power reduction expected to be applied into account when performing the positioning measurement procedure related to the at least one positioning measurement and/or a radio transmission procedure involving uplink radio signals transmitted by the wireless device to enhance positioning measurement performance of the positioning measurement procedure.

According to yet still another aspect the object is achieved by a network node for enabling positioning of a wireless device and/or configuring the wireless device and/or a measuring node for performing a positioning measurement. The network node comprises processing means being configured to obtain information related to a maximum power reduction applied or a maximum power reduction expected to be applied on uplink signals transmitted by the wireless device, which are used by the wireless device and/or measurement node for performing at least one positioning measurement. The processing means further being configured to adapt at least one positioning measurement procedure related to the at least one positioning measurement, based on the maximum power reduction applied, or the maximum power reduction expected to be applied, to enhance positioning performance. The adaptation comprises one or more of: adapting parameters related to the at least one positioning measurement using uplink signals transmitted by the wireless device; switching to a positioning method which does not require a measurement on uplink signals transmitted by the wireless device; and discarding a positioning measurement that use uplink signals transmitted by the wireless device.

According to a further aspect the object is achieved by a measuring node for performing a positioning measurement on at least uplink signals transmitted by a wireless device. The measuring node comprises processing means being configured to obtain information related to a maximum power reduction applied, or a maximum power reduction expected to be applied on uplink signals transmitted by the wireless device, which uplink signals are used by the measuring node for performing at least one positioning measurement. The processing means further being configured to adapt at least one positioning measurement procedure related to the at least one positioning measurement to enhance positioning performance, based on the maximum power reduction applied, or the maximum power reduction expected to be applied.

According to yet a further aspect the object is achieved by computer programs and a computer-readable storage medium having a computer program stored thereon that when executed on a processor performs the methods described herein.

Embodiments herein describe a solution or solutions that enable positioning that may not be degraded even when the wireless device applies or will apply maximum power reduction. Thus, resulting in a solution that positions or enabling a positioning that is efficient and reliable.

DETAILED DESCRIPTION

The embodiments described herein also apply to multi-point carrier aggregation systems i.e. are applicable to each CC in CA or in CA combination with COMP etc.

Figure 1:
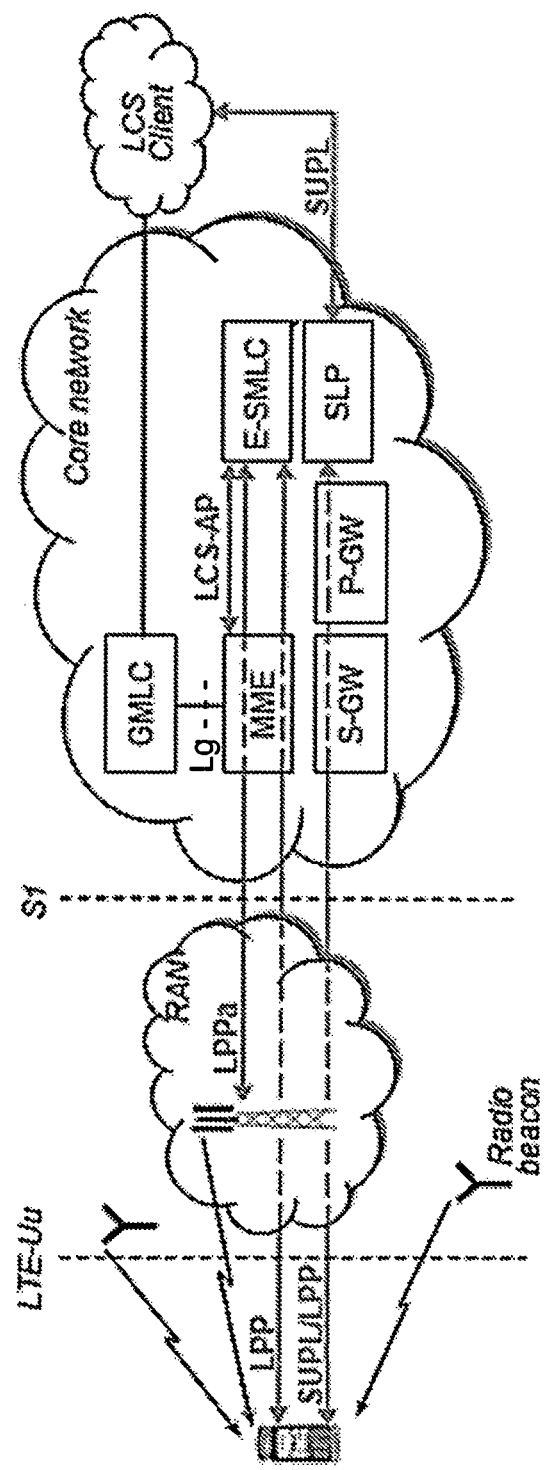
FIG. 1: Positioning architecture in LTE
Figure 2:
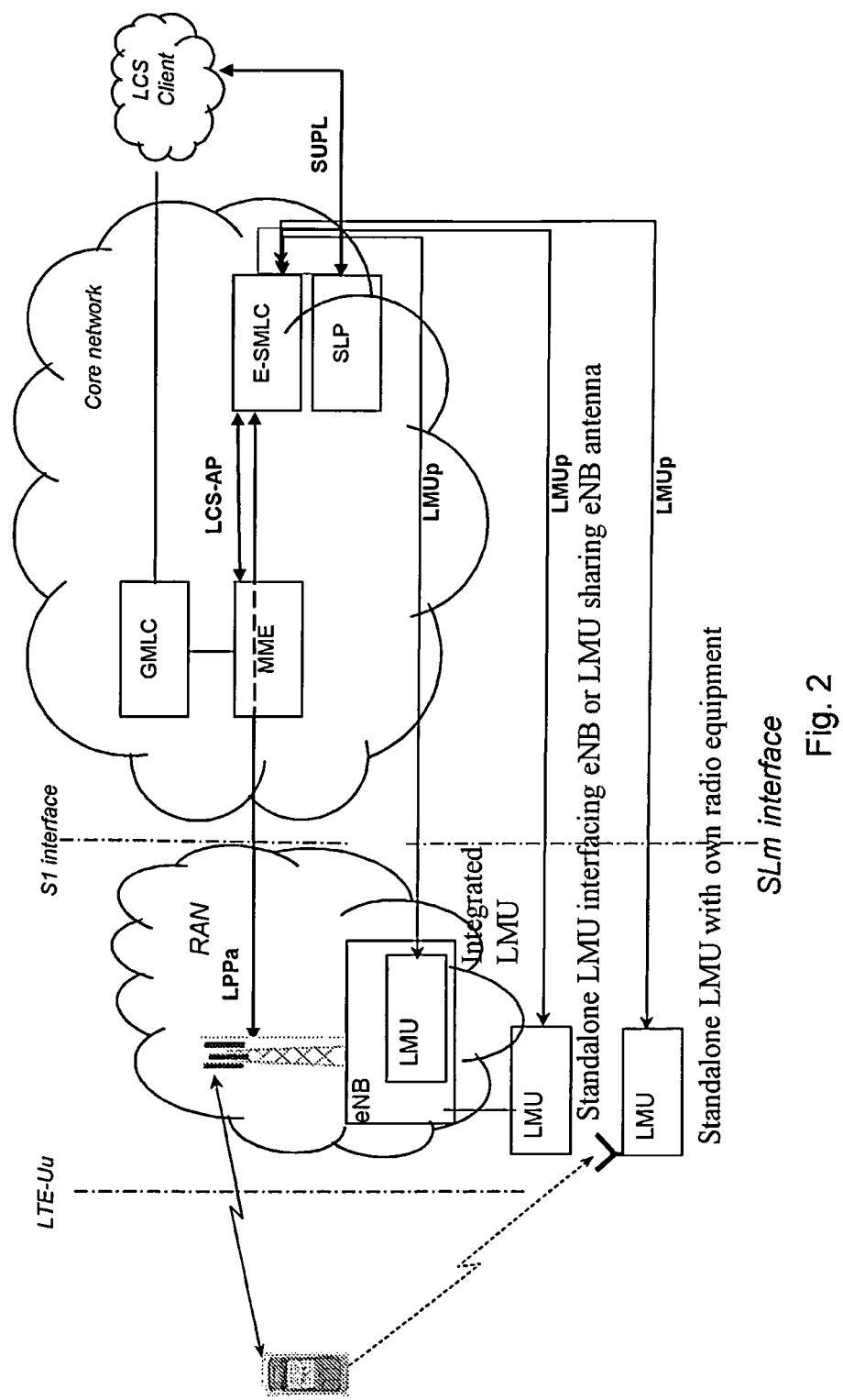
FIG. 2: UL positioning architecture in LTE
Figure 3:
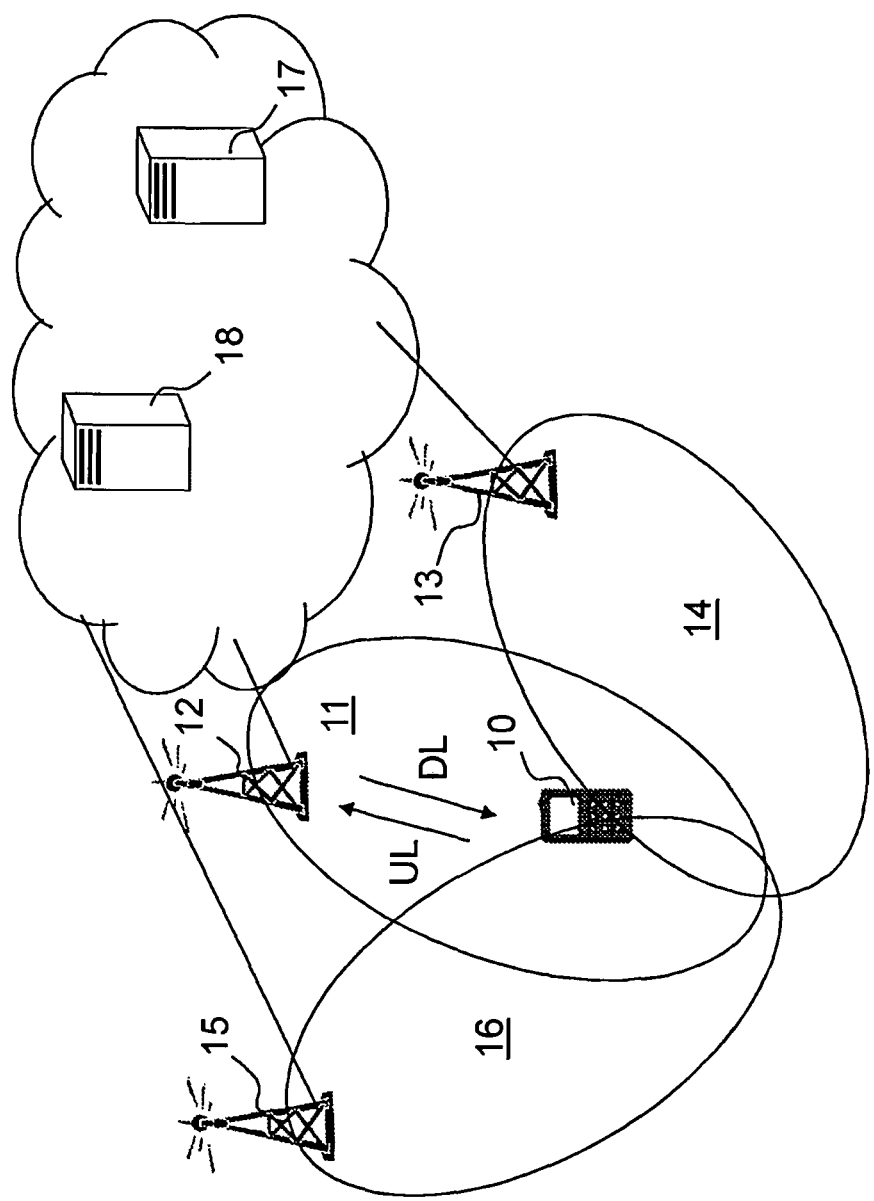
FIG. 3: is a schematic overview depicting a radio communications network according to some embodiments

FIG. 3 is a schematic overview of a radio communications network such as a Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), network just to mention a few possible implementation. The radio communications network comprises a measuring node 12 such as a radio network node, e.g. a first radio base station, providing radio coverage over at least one geographical area forming a first cell 11. A wireless device 10 also referred to as a user equipment is served in the first cell 11 by the first radio base station and is communicating with the first radio base station. The wireless device 10 transmits data over a radio interface to the first radio base station in an uplink (UL) transmission and the first radio base station transmits data to the wireless device 10 in a downlink (DL) transmission. The radio communications network may further comprise a second radio base station 13. The second radio base station 13 provides radio coverage over another geographical area forming a second cell 14. The radio communications network may further comprise a third radio base station 15. The third radio base station 15 provides radio coverage over another geographical area forming a third cell 16. Furthermore, the radio communications network may comprise a network node 17, such as a positioning node, and a Mobility Management Entity (MME) 18 arranged in a core network of the radio communications network. The MME 18, the measuring node 12 and the radio base stations 13,15 may all be referred to as a network node.

The positioning node may also be exemplified as a Location Service (LCS) server, Server Mobile Location Centre (SMLC), Secure User Plane Location (SUPL) Location Platform (SLP) or any server enabled to perform positioning of the wireless device 10.

'A wireless device' and 'UE' are used interchangeably in the description. The wireless device 10 may comprise any device equipped with a radio interface and capable of at least generating and transmitting a radio signal to the radio network node. Note that even some radio network nodes, e.g., a relay, an LMU, or a femto BS (aka home Base Station), may also be equipped with a UE-like interface, e.g., transmitting in UL and receiving in DL. Some examples of a wireless device that are to be understood in a general sense are laptop, mobile, smartphone, mobile tablet, multimedia communication device, sensor, fixed relay, mobile relay, wireless device capable of device-to-device (D2D) communication, wireless device for short-range communication, e.g., Bluetooth, wireless device capable of machine-to-machine (M2M) communication, aka machine type communication (MTC), customer premise equipment (CPE) for fixed wireless access, any radio network node equipped with a UE-like interface, e.g., small RBS, eNodeB, femto BS, LMU.

A radio node is characterized by its ability to transmit and/or receive radio signals and it comprises at least a transmitting or receiving antenna, own or shared with another radio node. A radio node may be a UE or a radio network node. Some examples of radio nodes are the measuring node 12, the radio base stations 13,15, e.g., eNodeB in LTE or NodeB in Universal Terrestrial Radio Access Network (UTRAN), a relay, a mobile relay, remote radio unit (RRU), remote radio head (RRH), a sensor, a beacon device, a measurement unit, e.g., LMUs, user terminal, PDA, mobile, smartphone, laptop, etc. A radio node may be capable of operating or receiving radio signals or transmitting radio signals in one or more frequencies, and may operate in single-RAT, multi-RAT or multi-standard mode, e.g., an example dual-mode user equipment may operate with any one or combination of WiFi and LTE or HSPA and LTE/LTE-A; an example eNodeB may be a dual-mode or Multi Standard Radio (MSR) BS.

The measuring node 12 is a radio node performing measurements on radio signals. Depending on the embodiments, the measuring node 12 may perform measurements on DL signals, e.g., the wireless device 10 or a radio network node equipped with a UE-like interface, relay, etc, or UL signals, e.g., a radio network node in general, the radio base stations 13, 15, eNodeB, Wireless Local Access Network (WLAN) access point, LMU, etc.

A radio network node is a radio node comprised in a radio access network, unlike the wireless device 10. A radio network node e.g., including, the radio base stations 13,15, measuring node 12, eNodeB, single- or multi-RAT BS, multi-standard BS, RRH, LMU, RRU, WiFi Access Point, or even transmitting-only/receiving-only nodes, may or may not create own cell and may comprise in some examples a transmitter and/or a receiver and/or one or more transmit antennas or one and/or more receive antennas, where the antennas are not necessarily co-located. It may also share a cell with another radio node which creates own cell. More than one cell may be associated with one radio network node. Further, one or more serving cells, in DL and/or UL, may be configured for the wireless device 10, e.g., in a carrier aggregation system where a wireless device may have one Primary Cell (PCell) and one or more Secondary Cells (SCells). A radio network node may also comprise or be comprised in multi-antenna or DAS.

The network node 17 may be any radio network node or core network node. Some non-limiting examples of a network node are an eNodeB, Radio network Controller (RNC), a positioning node, the MME 18, Public Safety Answering Point (PSAP), Self Organising Networks (SON) node, Trace Element (TCE), Minimisation of Drive Tests (MDT) node, typically but not necessarily, a coordinating node, a gateway node, and Operation and Management (O&M) node.

The positioning node, which is an example of the network node 17, described in different embodiments is a node with a positioning functionality. For example, for LTE it may be understood as a positioning platform in the user plane, e.g., SLP in LIE, or a positioning node in the control plane, e.g., E-SMLC in LTE. SLP may also consist of SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In some examples, positioning functionality may also fully or partly reside in a radio network node, e.g. RNC or eNB. In a testing environment, a positioning node may be simulated or emulated by test equipment.

The term "coordinating node" used herein is a network node, which coordinates radio resources with one or more radio nodes. Some examples of the coordinating node are network monitoring and configuration node, Operations Support System (OSS) node, O&M, TCE, MDT node, SON node, positioning node, MME, a gateway node such as Packet Data Network Gateway (P-GSW or Serving Gateway (S-GW) network node or femto gateway node, a macro node coordinating smaller radio nodes associated with it, eNodeB coordinating resources with other eNodeBs, etc.

The signaling described herein is either via direct links or logical links, e.g. via higher layer protocols and/or via one or more network and/or radio nodes. For example, signaling from a coordinating node may pass another network node, e.g., a radio network node.

The embodiments herein are not limited to LTE, but may apply with any Radio Access Network (RAN), single- or multi-RAT with or without carrier aggregation support. Some other RAT examples are LTE-Advanced, UMTS, HSPA, GSM, cdma2000, WiMAX, and WiFi.

An UL transmission or an UL radio signal herein is in general any radio signal transmission by the wireless device 10, wherein the transmission may be a dedicated or directed transmission towards a specific node, e.g., eNodeB, LMU, another wireless device, relay, repeater, etc, or a multicast or a broadcast transmission transmitted by the wireless device 10. In some examples, an UL transmission may even be a peer-to-peer transmission or device-to-device communication, when the transmission is by a wireless device and/or in a frequency spectrum, e.g., frequency band or carrier, intended for UL transmissions. Some examples of UL radio signals are reference signals transmitted by the wireless device 10, e.g. Sounding Reference Signal (SRS) or demodulation reference signals transmitted in UL, dedicated or shared channels transmitted by the wireless device 10, e.g. data channels, control channels, random access channel, a broadcast channel transmitted by the wireless device 10, etc., or other physical signals, e.g., transmitted by the wireless device 10 to support device-to-device communication such as for neighbor discovery or presence/activity indication or transmitting a beacon signal/message. UL radio signals in the embodiments described herein may or may not be configured specifically for positioning and may or may not be used for positioning measurements.

The term "UL measurement" herein refers to a measurement performed on one or more UL radio signals described above. In general, an UL measurement is a measurement involving at least one UL component, where a measurement may comprise one or more of: a physical-layer measurement and a physical channel reception. One radio measurement may comprise sampling one or more radio signal samples, e.g., different samples may be comprised in different time and/or frequency resources. Such measurements may be timing measurements, power-based measurements, direction measurements, etc., which may be performed for any purpose—see also the corresponding section for existing measurements. Some specific examples of UL measurements, involving at least one UL component, are a measurement on multifarious links, a composite measurement included herein by reference, UL TDOA or Time of Arrival (TOA) measurement, UL AoA, UE Rx-Tx, eNodeB Rx-Tx, UL received signal strength or quality, UL pathloss measurement, any radio network node, e.g., eNodeB or LMU, measurement described in 3GPP TS 36.214 version 11.0.0, etc. The measurement with at least one UL component may involve radio links between two or more radio nodes, e.g., three radio nodes may be involved with multifarious links or Time Difference of Arrival (TDOA) measurements, and the radio links may or may not be on the same frequency, same CC, same frequency band, or same RAT.

I some embodiments, UL positioning measurements are described. Herein, the following terms may be used interchangeably: UL measurements used for positioning, measurements used for UL positioning, and UL positioning measurements, and comprise any radio measurement which may be performed on radio signals configured for positioning or other purpose and wherein the measurements are used at least for positioning. The term UL positioning at least in some embodiments may refer e.g. to UTDOA. Further, UL positioning measurements may comprise, e.g., UL RTOA, but may also be any of the following: UL TOA, UL TDOA, UL AoA, UL power-based measurement, e.g., UL received signal quality or UL received signal strength measurement, UL propagation delay, a two-directional measurement involving an UL measurement component, e.g. RTT, eNodeB Rx-Tx or UE Rx-Tx), or any positioning measurement in general involving at least one UL measurement component.

As part of developing embodiments herein a problem has first been identified. The maximum reduction of output power of a wireless device also referred to as UE maximum output power reduction due to any type of Maximum Power Reduction (MPR) degrades the performance of a positioning measurement which is performed on at least UE-transmitted radio signals. The performance of a positioning may become even worse when performed by a measuring node when being far from the location of the wireless device. This will lead to worse positioning measurement accuracy, which eventually degrades the positioning accuracy of UE location based on one or more of these positioning measurements. According to embodiments herein the positioning measurements involving UL transmitted signals or any corresponding positioning measurement procedure does account for the effect of the MPR, any other output power reduction, e.g., accounting for the power tolerance—see e.g. below, or a network-configurable transmit power limitation, e.g. Power (P)-max signaled over Radio resource Control (RRC) to the wireless device 10. The wireless device 10 may apply maximum power reduction to meet radio requirements e.g. co-existence with other systems, out of band emissions etc. The UE maximum transmit power reduction, such as power back-off, is currently not taken into account when positioning measurements are configured and/or performed. Several positioning measurements are performed on or involve uplink signals. The reduction in UE maximum transmit power, or maximum transmit power of the wireless device 10, will lead to degradation in positioning measurement performance.

The 'MPR' is in its general sense as described below.

Concepts Related to UE Maximum Power Reduction (MPR)

A UE power class defines the UE maximum output power for any transmission bandwidth within the channel bandwidth. In LTE hitherto, two UE power classes are defined: power class 3=23 dBm and power class 1=31 dBm. In HSPA several power classes are defined e.g. 21 dBm, 24 dBm, 30 dBm. The maximum power corresponding to the UE power class is also called a UE nominal maximum output power level.

The wireless device 10 may be allowed to reduce its maximum power below the UE nominal maximum output power level under the following scenarios or conditions:

When explicitly indicated by the network, e.g. a network node

To enable the wireless device 10 to meet out of band radio emission requirements To enable the wireless device 10 to meet additional emission requirements e.g. specific to a deployment scenario To enable the wireless device 10 to meet Radio Frequency (RF) exposure requirements The above scenarios give rise to different types of maximum power reductions, which may be applied by the wireless device 10. These are described in the following description.

Network Configuration of UE Maximum Output Power

The serving network node may configure the wireless device 10 by the virtue of higher layer signaling, e.g. RRC. Medium access Control (MAC) signaling etc, to operate at a maximum output power below its nominal maximum output power level i.e. below the maximum power corresponding to its power class. The configuration may be done for each wireless device 10 individually or for group of wireless devices or even for all wireless devices in a cell.

The reduction in maximum output power of the wireless device 10 is typically done to lower the interference at the serving radio node, e.g. measuring node 12, and/or at the neighboring radio nodes, e.g. radio base stations 13,15.

For example in cells with smaller coverage area, e.g. pico cell served by local area BS, femto cells served by home BS etc, the received uplink interference can be reduced by configuring the wireless device 10 to operate at a maximum output power below its UE nominal maximum output power.

UE MPR to Meet Emission Requirements

A UE or any wireless device such as the wireless device 10, which typically operates in a well-defined portion of a frequency band, occurrences of emissions outside its channel bandwidth and also outside its operating frequency band are unavoidable, These emissions outside the Bandwidth (BW) or frequency band are often termed as Out of Band emissions (OOB) or unwanted emissions.

The major OOB and spurious emission requirements are typically specified by the standard bodies and eventually enforced by the regulators in different countries and regions for both wireless devices and the base stations The OOB emission requirements are comprised of:

Adjacent Channel Leakage Ratio (ACLR)

Spectrum Emission Mask (SEM)

The specific definition and the specified level of OOB and spurious emissions may vary from one system to another. Typically these requirements ensure that the emission levels outside the transmitter channel bandwidth or operating band remain several tens of dB below the transmitted signal. Emission levels tend to decay dramatically further away from an operating band but they are not completely eliminated at least in the adjacent carrier frequencies.

The emissions both inside and outside the BW and/or frequency band of operation are also exposed to human body.

MPR Based on Pre-defined Requirements

The wireless device 10 has to meet the radio emission requirements when transmitting in the uplink, e.g. OOB and spurious emission requirements irrespective of their transmission power level. For the wireless device 10 the conservation of its battery power is very critical. This requires that the wireless device 10 has an efficient PA. The PA is therefore typically designed for certain typical operating points or configurations or set of parameter settings e.g. modulation type, number of active physical channels, e.g. resource blocks in evolved UMTS Terrestrial Radio Access (E-UTRA) or number of CDMA channelization codes code/spreading factor in UTRA. But in practice the wireless device 10 may operate using any combination of modulation, physical channels etc. Therefore, in some UL transmission scenarios the power amplifier of the wireless device 10 may not be able to operate in the linear zone, thereby causing unwanted emissions due to harmonics or other non-linear characteristics. To ensure that the wireless device 10 fulfills OOB/spurious requirements for all allowed UL transmission configurations the UE is allowed to reduce its maximum UL transmission power in some scenarios. This is called maximum power reduction or UE power back-off in some literature. For instance a UE with maximum transmit power of 24 dBm power class may reduce its maximum power from 24 dBm to 23 or 22 dBm depending upon the configuration.

The MPR values for different configurations are generally well specified in the standard. The wireless device 10 may use these values to apply MPR when the conditions for the corresponding configurations are fulfilled. These MPR values are regarded as static in a sense that they are independent of resource block allocation and other deployment aspects.

In LTE for UE Power Class 3, the allowed MPR is defined as a function of modulation and transmit bandwidth configuration, e.g. resource blocks, as shown in table 1.

TABLE 1

Maximum Power Reduction (MPR) for Power Class 3

| | Channel bandwidth/Transmission bandwidth ($N_{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

The MPR may also be pre-defined as a function of another performance metric e.g. as a function of cubic metric (CM) e.g. MPR=CM−1 as in HSPA. The CM is a power of the third order non-linearity due to non-linear characteristics of the PA. The CM in turns depends upon the gain factors of UL transmitted physical channels.

In LTE the Random Access (RA) transmission may also involve a CM depending upon the RA preamble sequence. Currently no MPR due to CM in RA is allowed. However, this may be introduced in future release and in this case the wireless device 10 may apply MPR as a function of CM when transmitting preamble for the sending random access.

Additional Maximum Power Reduction A-MPR

In E-UTRA an Additional MPR (A-MPR) for the transmitter of the wireless device 10 has also been specified in addition to the normal MPR. The difference is that the former is not fully static. Instead, the A-MPR may vary between different cells, operating frequency bands and more specifically between cells deployed in different location areas or regions. In other words, the A-MPR is used to enable the wireless device 10 to meet co-existence requirements which are regional and/or band specific. In particular the A-MPR may be applied by the wireless device 10 in order to meet the additional emission requirements, aka additional spurious emission requirements, imposed by the regional regulatory organization for a particular deployment scenario e.g. bands, region, type of other systems operating in adjacent bands, A-MPR is an optional feature, which is used by the network when needed depending upon the co-existence scenario.

In summary the A-MPR defines the UE maximum output power reduction, on top of the normal MPR, needed to fulfill certain emission requirements by accounting for factors such as: bandwidth, frequency band or resource block allocation.

As stated above that the additional regulatory requirements may vary from one region to another and from one network to another. The presence of additional regulatory requirements is signalled via a cell specific signalling known as Network Signalling (NS). Associated with the NS signalling there is a set of A-MPR values which may depend on for example resource block allocation, frequency band, channel bandwidth etc.

To meet the regulatory emission requirements, the A-MPR required could vary from one part of the network to another. This is due to the factors such as the variable bandwidth, varying number of resource block allocation, different bands in different parts of the networks etc. Even if the deployment scenario, in terms of bands used, bandwidth size etc., is homogeneous in a large coverage area, there will always be border regions between these coverage areas. Therefore A-MPR is a cell specific value.

Due to the above reasons the NS value is signaled to the wireless device 10 via system information in a UE specific channel or in a broadcast message. This allows the wireless device 10 to acquire this information when it camps on to a cell. The acquired NS value which is associated with a cell is then used by the wireless device 10 to map to certain A-MPR and reduce its maximum output power whenever it transmits in the uplink.

Examples of A-MPR corresponding to different NS values are shown in table 2, which is reproduced from TS 36.101 section 6.2.4 version 11.2.0.

UE Maximum Power Reduction to Limit RF Exposure

Another important factor is the human exposure to radiofrequency (RF) Electromagnetic Fields (EMF), which are transmitted by the wireless device 10. The most important guidelines on RF exposure to human are from the International Commission on Non-Ionizing Radiation Protection (ICNIRP, 1998) and from the Institute of Electrical and Electronics Engineers (IEEE, 1999). The limits in these recommendations are similar and they have been used as the basis for national standards and regulations in many countries. The International Commission on Non-Ionizing Radiation Protection (ICNIRP) guidelines, which are the most widely used recommendations, have been endorsed by the World Health Organization (WHO).

These RF exposure guidelines are science-based and the prescribed limits have been set with substantial safety margins. They provide protection from all established health effects from short-term and long-term exposure to RF fields, and the safety of children and other segments of the population have been taken into account.

Specific Absorption Rate (SAR) is introduced to measure impact on the human body from the exposure of RF EMF transmitted by the wireless device 10. SAR is a measure of the maximum energy absorbed by a unit of mass of exposed tissue of a person using a mobile phone, over a given time or more simply the power absorbed per unit mass. Advised by ICNIRP, the communication administration departments of different countries issued the SAR limits. For instance, the

TABLE 2

Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | NA |
| NS_03 | 6.6.2.2.1 | 2, 4, 10, 23, 25, 35, 36 | 3 | >5 | ≤1 |
|  |  |  | 5 | >6 | ≤1 |
|  |  |  | 10 | >6 | ≤1 |
|  |  |  | 15 | >8 | ≤1 |
|  |  |  | 20 | >10 | ≤1 |
| NS_04 | 6.6.2.2.2 | 41 | 5 | >6 | ≤1 |
|  |  |  | 10, 15, 20 | Table 6.2.4-4 | |
| NS_05 | 6.6.3.3.1 | 1 | 10, 15, 20 | ≥50 | ≤1 |
| NS_06 | 6.6.2.2.3 | 12, 13, 14, 17 | 1.4, 3, 5, 10 | Table 5.6-1 | n/a |
| NS_07 | 6.6.2.2.3 6.6.3.3.2 | 13 | 10 | Table 6.2.4-2 | |
| NS_08 | 6.6.3.3.3 | 19 | 10, 15 | >44 | ≤3 |
| NS_09 | 6.6.3.3.4 | 21 | 10, 15 | >40 | ≤1 |
|  |  |  |  | >55 | ≤2 |
| NS_10 |  | 20 | 15, 20 | Table 6.2.4-3 | |
|  |  |  |  | Table 6.2.4-3 | |
| NS_11 | 6.6.2.2.1 | 23[1] | 1.4, 3, 5, 10, 15, 20 | Table 6.2.4-5 | |
|  |  |  |  | Table 6.2.4-5 | |
| NS_12 | 6.6.3.3.5 | 26 | 1.4, 3, 5 | Table 6.2.4-6 | |
|  |  |  |  | Table 6.2.4-6 | |
| NS_13 | 6.6.3.3.6 | 26 | 5 | Table 6.2.4-7 | |
|  |  |  |  | Table 6.2.4-7 | |
| NS_14 | 6.6.3.3.7 | 26 | 10, 15 | Table 6.2.4-8 | |
|  |  |  |  | Table 6.2.4-8 | |
| NS_15 | 6.6.3.3.8 | 26 | 1.4, 3, 5, 10, 15 | Table 6.2.4-9, Table 6.2.4-10 | Table 6.2.4-9, Table 6.2.4-10 |
| NS_16 | 6.6.3.3.9 | 27 | 3, 5, 10 | Table 6.2.4-11, Table 6.2.4-12, Table 6.2.4-13 | |
| NS_17 | 6.6.3.3.10 | 28 | 5, 10 | Table 5.6-1 | n/a |
| NS_18 | 6.6.3.3.11 | 28 | 10, 15, 20 | ≥1 | ≤4 |
| NS_19 | 6.6.3.3.12 | 44 | 10, 15, 20 | Table 6.2.4-14 | |
| ... |  |  |  |  |  |
| NS_32 | — | — | — | — | — |

Federal Communications Commission (FCC) has determined that the SAR limit is 1.6 W/kg for cell phone. The SAR limit in Europe and in most of countries is 2 W/kg.

The wireless device 10 should comply with the SAR requirements or any type of requirements for limiting the RF exposure to human which are specified by the regulator in an individual country, region, province or state etc. In order to meet these requirements the wireless device 10 may also have to reduce its maximum output power. Hence the UE maximum output power is limited by the SAR limit.

In prior art a generic term called power management is also interchangeably used for controlling emissions to limit the SAR. A Power management MPR (P-MPR) is the amount of UE output power reduction to meet the RF exposure requirements.

The P-MPR may also be band dependent. It may also vary from one region to another. It is generally pre-defined in the standard.

In prior art one or more parameters associated with the P-MPR to be applied by the wireless device 10 to meet the SAR or any type of RF exposure requirements are signaled to the wireless device 10. This means the P-MPR may also be signaled to the wireless device 10. This is due to the fact that SAR or RF exposure requirements may vary from one region to another. Hence the amount of the P-MPR required by the wireless device 10 to meet the requirements may vary from one cell to another.

UE Maximum Power Reduction Due to Advanced Features

In addition to the scenarios mentioned above the wireless device 10 may apply additional MPR to meet the radio emission requirements and/or RF exposure requirements when the wireless device 10 operates in conjunction with one or more advanced features such as:

UL multi-cluster transmission
Carrier aggregation
Multi-SIM multi-call operation or more commonly dual Subscriber Interface Module (SIM) dual call operation
Wireless device capable of simultaneous multi-RAT operation e.g. simultaneous operation of LTE and CDMA2000.
High-end wireless devices equipped with proximity detector to detect proximity to human body e.g. Tablets, Laptop mounted equipment etc.
  These may operate close to human body causing RF exposure to human tissue. The High-end wireless devices may apply P-MPR to meet regulatory requirements when operating close to human body.

The MPR in the above operating scenarios can be pre-defined, e.g. MPR, P-MPR, or signaling by the network, e.g. A-MPR.

UL Multi-cluster Transmissions

Figure 4:
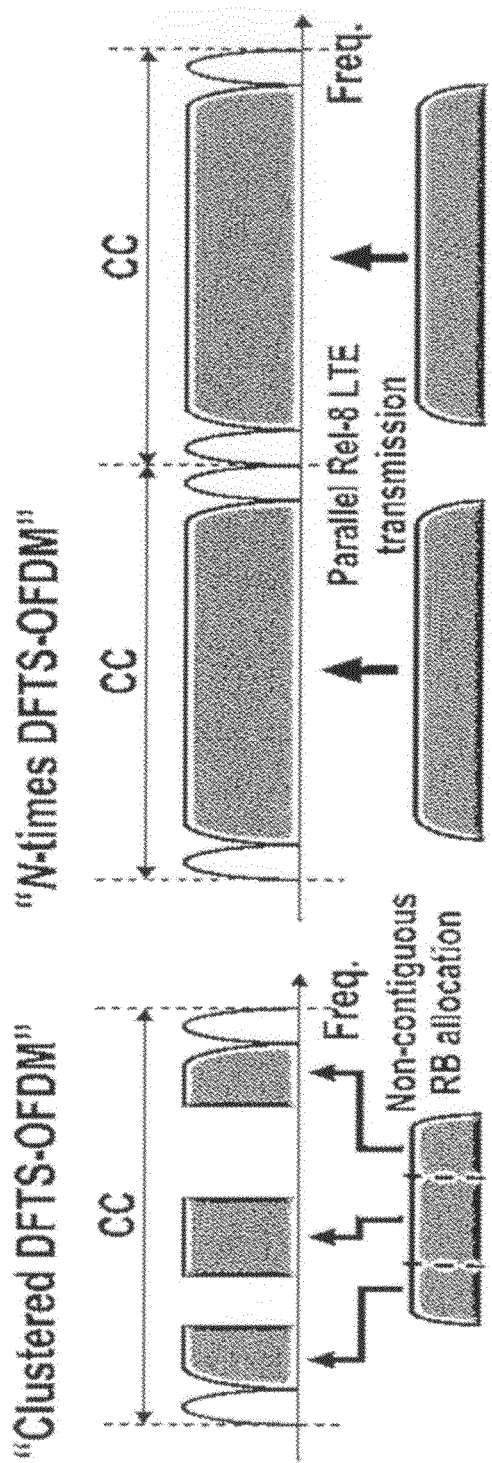
FIG. 4: Multi-cluster UL transmission vs. multi-carrier transmission

In carrier aggregation the wireless device 10 may transmit over multiple CCs, aka N-times clustered Discrete Fourier Transform Spreading (DFTS)—Orthogonal frequency-division multiplexing (OFDM); however, the wireless device 10 may also have a multi-cluster transmission, aka in 3GPP UL resource allocation type 1) within a carrier or CC and hereby allowing for non-contiguous allocation of scheduled resource blocks, for Physical Uplink Shared Channel (PUSCH) only, and thus giving more scheduling flexibility in frequency domain for UL e.g., enabling more flexible frequency-selective scheduling in UL. The number of clusters is limited to two in LIE. FIG. 4 shows Multi-cluster UL transmission vs, multi-carrier transmission. The clustered DFTS-OFDM is shown to the left in the figure, where a Non-contiguous RB allocation is used over the CC. A N-times DFTS-OFDM transmission is shown to the right in the figure, where parallel Rel-8 LTE transmission is used over a respective CC.

The multi-cluster technique, however, produces a peakier signal, i.e. its associated cubic metric (measure for peakyness) is increased resulting in a larger required power backoff at the wireless device 10. Multi-cluster transmissions—especially with large frequency separation between clusters—together with non-linear transmitters lead to spectrum regrowth also requiring power backoff. The same problem occurs when different signals are transmitted simultaneous, e.g. simultaneous transmission of PUSCH and Physical Uplink Control Channel (PUCCH).

For multi-clustered simultaneous transmission in single component carrier, the allowed MPR for the maximum output power in Table 1 is modified as follows:

$$\text{MPR}=\text{CEIL}\{M_A, 0.5\},$$

where $M_A$ is defined as follows
  $M_A=[8.0]-[10.12]A$, for $0<A\leq[0.33]$,
  $M_A=[5.67]-[3.07]A$, for $[0.33]<A\leq[0.77]$,
  $M_A=[3.31]$, for $[0.77]<A\leq[1.0]$,
where $$A=N_{RS\_alloc}/N_{RB\_agg}$$

In the above, $\text{CEIL}\{M_A, 0.5\}$ means rounding upwards to closest 0.5 dB, i.e. MPR∈[3.0, 3.5 4.0 4.5 5.0 5.5 6.0 6.5 7.0 7.5 8.0]. $N_{RB\_alloc}$ is the number of actually allocated resource blocks (RB) whereas $N_{RB\_agg}$ is the number of resource blocks spanning from lower edge of the lower cluster to the upper edge of the upper cluster.

Carrier Aggregation

In case of LTE intra-band contiguous carrier aggregation the allowed MPR is defined in Table 3.

TABLE 3

Maximum Power Reduction (MPR) for Power Class 3 with CA

| | CA bandwidth Class C | | | | |
| --- | --- | --- | --- | --- | --- |
| Modulation | 50 RB + 100 RB | 75 RB + 75 RB | 75 RB/100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

UE Maximum Transmit Power

The standard TS 36.101 section 6.2.5 version 11.2.0 allows the wireless device 10 to set its configured maximum output power.

For a non-CA UE, the maximum output power, $P_{CMAX}$, is set within the following bounds:

$$P_{CMAX\_L} \leq P_{CMAX} \leq P_{CMAX\_H}$$

where $P_{CMAX\_L}=\text{MIN}\{P_{EMAX}-\Delta T_C, P_{PowerClass}-\text{MAX}(\text{MPR}+\text{A-MPR, P-MPR})-\Delta T_C\}$ $P_{CMAX\_H}=\text{MIN}\{P_{EMAX}, P_{PowerClass}\}$ $P_{EMAx}$ is the value given to IE P-Max, defined in TS 36.331 and is a value in the range from −30 dBm to 30 dBm $P_{PowerClass}$ is the maximum UE power without taking into account the tolerance MPR and A-MPR are specified values P-MPR is the allowed maximum output power reduction for;
  a) Ensuring compliance with applicable electromagnetic energy absorption requirements and addressing unwanted emissions/self defense requirements in case of simultaneous transmissions on multiple RAT(s) for scenarios not in scope of 3GPP RAN specifications.
  b) Ensuring compliance with applicable electromagnetic energy absorption requirements in case of proximity detection is used to address such requirements that require a lower maximum output power.

$\Delta T_C$ is the tolerance parameter of 1.5 dB or 0 dB as specified in TS 36.101 section 62.5 version 11.2.0.

For a wireless device with intra-band contiguous CA with two uplinks, the total output power may be configured within $$P_{CMAX\_L\_CA} \leq P_{CMAX} \leq P_{CMAX\_H\_CA}$$

where $P_{CMAX\_L\_CA}=\text{MIN}\{10 \log_{10} \Sigma P_{EMAX,c}-\Delta T_C, P_{PowerClass}-\text{MAX}(\text{MPR}+\text{A-MPR, P-MPR})-\Delta T_C\}$ $P_{CMAX\_H\_CA}=\text{MIN}\{10 \log_{10} \Sigma P_{EMAX,c}, P_{PowerClass}\}$ A similar relation exists for inter-band CA.

The term "MPR" herein refers to any type of maximum power reduction, pre-defined or configurable, applied by the wireless device 10, e.g., comprising any one or more of:
  MPR required to meet any type of emission requirements e.g. P-MPR, A-MPR, OOB emissions, RF exposure, special co-existence requirements, requirements related to specific deployment, specific type of radio operation (e.g. CA, Dual SIM dual call, multi-cluster transmission etc),
  Any other output power reduction, e.g., accounting for the power tolerance—see e.g. Section "UE maximum transmit power" above,
  Network-configurable transmit power limitation, e.g. P-max signaled over RRC to the wireless device 10.

Thus, herein, for consistency the term 'MPR' is used which is more generic than the MPR term defined e.g. in TS 36.101, version 11.2.0, and it may apply to the total wireless device transmission power, for a subset of frequency carriers or per frequency carrier, for all or for a specific transmissions, certain signals or channels, for all or certain antennas.

The MPR information, also referred to as information related to a maximum power reduction applied, or a maximum power reduction expected to be applied on uplink signals transmitted from the wireless device 10, mentioned in at least some embodiments described herein may comprise, e.g., any one or more of:
  Indication of whether, when and/or how MPR is used, may be used, or will be used or not, e.g., MPR may be not used when the wireless device 10 has a good coverage and the signal quality is good since the wireless device 10 may not need to transmit at full power; the low interference conditions may occur in certain time and/or frequency resources e.g. positioning subframes or low-interference subframes),
  Type(s) of MPR,
  Dynamics of MPR, e.g., statically configured at least for certain signals or dynamically varying in time e.g. depending on the scheduled resources and thus causing additional signal fluctuations,
  Amount of MPR, total amount or the amount for a specific MPR,
  A reference value, e.g. P-max or UE power class, which can be used to determine MPR.
  An on-going transmission type that determines MPR, e.g., multi-cluster transmission, or operation type/mode that determines MPR, e.g., non-CA or a specific type of CA, and thus may be used to obtain the MPR characteristic.

In some embodiments, not the relative power reduction but instead or also the resulting absolute output power value may be used or may even be necessary. Hence the MPR information may also comprise the information about the resulting total absolute output power used, e.g., Pcmax, or alternatively a reference output power and the MPR value applied to it, Therefore, in at least some embodiments, signaling of the MPR may comprise signaling of the resulting output power after MPR (in its general sense) or MPR information together with a reference output power.

Embodiments described herein are:
  Method in the measuring node 12 of adapting positioning measurement procedure accounting for UE MPR
  Method in the wireless device 10 of adapting positioning measurement procedure accounting for UE MPR
  Method in the network node 17 (e.g., positioning node, eNB, MDT node, controlling node) of adapting positioning measurement procedure accounting for UE MPR Some embodiments disclose
  Method of enhancing positioning by adapting radio transmission procedure accounting for UE MPR
  Method of meeting pre-defined requirements under adaptation of positioning measurement procedure
  Method of obtaining capability of enhancing positioning measurement performance accounting for UE MPR
  Methods of meeting at least one pre-defined requirement when MPR may be applied to UL transmissions used for positioning.

The following sections describe the above main embodiments.

Figure 5:
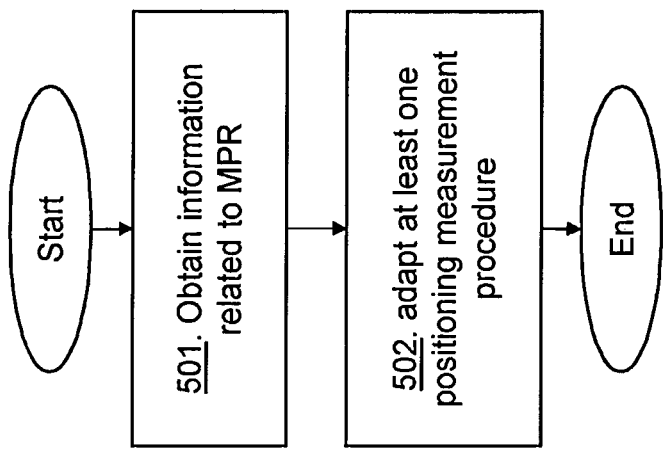
FIG. 5: A flow chart depicting a method in a measuring node

The method actions in the measuring node 12, exemplified as a radio base station, LMU or similar in the FIG. 3, for performing a positioning measurement procedure on at least UL signals transmitted by the wireless device 10 according to some embodiments will now be described with reference to a flowchart depicted in FIG. 5. The actions do not have to be taken in the order stated below, but may be taken in any suitable order.

Action 501. The measuring node 12 obtains information related to a maximum power reduction applied, or a maximum power reduction expected to be applied on uplink signals transmitted by the wireless device 10. The uplink signals are used by the measuring node 12 for performing at least one positioning measurement. For example, the measuring node 12 may receive information about a transmission configuration of signals transmitted from the wireless device 10, and to use the received information for obtaining the maximum power reduction or a maximum power reduction expected to be applied on uplink signals transmitted by the wireless device 10. The received information comprises at least one of: simultaneous transmission of Physical Uplink Shared Channel and Physical Uplink Control Channel, configuration of uplink carrier aggregation with or without multiple timing advance, time and/or frequency resources, modulation scheme, clustered or clustered transmissions. The information may e.g. be received from any of a positioning node, a network node or the wireless device 10. The information may further be obtained from the network node 17 or the wireless device 10.

Action 502. The measuring node 12 adapts at least one positioning measurement procedure related to the at least one positioning measurement to enhance positioning performance, based on the maximum power reduction applied, or a maximum power reduction expected to be applied. E.g. the measuring node 12 may adapt a parameter and/or a procedure that relates to the measuring node 12, configure the wireless device 10, or both.

The measuring node 12 may perform the method action by an autonomous decision of the measuring node 12, when received an explicit request from a network node, and/or according to a predefined rule.

Method in the Measuring Node 12 of Adapting Positioning Measurement Procedure The embodiment described in this section discloses some embodiments of the method, described above, in the measuring node 12, e.g. being a BS, relay, LMU, another wireless device, etc, of e.g. performing one or more positioning measurements, e.g. UL RTOA, AoA, TA, received signal strength or quality, etc, on at least signals transmitted by one or more wireless device, the method may comprise:

Obtaining information related to the MPR applied, or expected to be applied by the transmitting wireless device 10 on signals used for at least one positioning measurement by the measurement node 12;

Adapting at least one measurement procedure related to the at least one positioning measurement.

The above mentioned steps are elaborated below.

Method in the Measuring Node 12 of Obtaining MPR Information, Relating to Action 501

In one example the measuring node 12 acquires the information related to the at least one type of MPR, e.g. MPR, A-MPR, P-MPR etc, that the wireless device 10 may apply based on pre-defined information. For example the receiver of the measuring node 12 may determine the radio transmission configuration of the signals transmitted by the wireless device 10 e.g. modulation type such as Quadrature Phased Shift Keyed (QPSK), 16 Quadrature Amplitude Modulator (QAM) etc, number of resource blocks and the location of the resource blocks transmitted by the wireless device.

In one example, the determination may be blind, i.e., with no or limited information about the transmission configuration.

In another example, the determination may be autonomous by the measuring node 12.

In yet another example, to determine MPR the measuring node 12 may use e.g. any one or more of:
the information available in the measuring node 12, pre-defined rules,
absolute or relative radio measurements performed by itself, by the wireless device 10 and/or another node, e.g., any one or more of:
DL and/or UL received signal strength, quality or pathloss measurements,
Channel quality reports, e.g., Channel Quality Indicator (CQI) reports,
Coverage loss rate or measurement failure rate,
Parameters related to power control,
Measurements related to or an indication of a transmit power level, e.g., an indication of whether the maximum transmit power has been used such as in an MDT measurement report, e.g.

The measuring node 12 may also receive or obtain information related to the current or average transmitted power of the wireless device 10 from the wireless device 10 itself or from another node that has this information. For example UE power headroom (PH) report which reflects the available power may be obtained by the measuring node 12. The PH is the difference between the UE maximum power after MPR and UE transmitted power in log scale, Indication of proximity to a node or to a human body, which may be indicative of potentially applying MPR.

In yet another example, the measuring node 12 may also receive explicit information about the wireless device's radio transmission configuration from another node, e.g. positioning node, eNodeB or the wireless device 10 itself. The measuring node 12 may then use this determined radio transmission configuration to obtain the MPR which the wireless device 10 may apply from the pre-defined table mapping the radio transmission configuration to the avowed MPR.

The transmission configuration may comprise any one or more of:
time and/or frequency resources, e.g., subframes, radio frames, symbols, subcarriers, frequencies, CC, resource blocks in frequency domain, etc., or pattern, transmit pattern or measurement pattern, when the radio signal is transmitted by the transmitting wireless device 10 or received by the measuring node 12, in a special example, the MPR reduction may apply irrespective of the time and/or frequency resources, where the time/frequency resource configuration may comprise resources for which MPR applies and/or MPR does not apply,
signal or channel type, in a special example, all signals and/or all channels may be subject to MPR reduction,
signal or channel type combinations, e.g. simultaneous transmission of PUSCH and PUCCH
configuration of UL carrier aggregation, with or without multiple timing advance values
transmissions configured for a specific measurement type or measurement purpose, e.g., for a timing measurement configured for positioning or MDT,
transmission periodicity,
transmission period start and/or end,
transmission interval duration or the number of transmissions,
transmission bandwidth, total and/or on which MPR is applied,
transmission power which may be absolute or relative, e.g., to other signals or transmissions in other time and/or frequency resources,
Modulation scheme and format, e.g. OFDM, single-carrier, Single Carrier—Frequency Domain Multiple Access (SC-FDMA), clustered transmissions, QPSK, 16QAM etc In yet another example the measuring node 12 may receive the information about the MPR currently applied by the wireless device 10 or being applied over certain duration e.g. during 2-5 Transmission Time Interval (TTI) from one or more of the following sources:
Wireless device 10 e.g. it directly sends the overall MPR value, e.g. including MPR, A-MPR, P-MPR etc, to the measuring node 12

Positioning node. For example the positioning node may obtain MPR from network node such as eNode B or UE and forward it to LMU.

Another network node, e.g., from a eNB, a coordinating node, SON node, O&M node, etc., which contains MPR that the wireless device 10 applies e.g. A-MPR, P-MPR, etc. where the MPR may be e.g., UE-specific, UE group specific, area-specific, or cell or serving node specific.

The measuring node 12 may also use the obtained information about the MPR, the determined available UE power and/or UE transmitted power, e.g., based on measurements, indication, PH reports, etc., to determine whether the UE is applying or will apply MPR on uplink transmitted signals or not. For example if the transmitted power of wireless device 10 is close to maximum output power then depending upon the radio transmission configuration the wireless device 10 is applying or will apply MPR.

Method in a Measuring Node of Adapting Measurement Procedure, Relating to Action 502

If the measuring node 12 determines that the wireless device has been applying, may apply or will apply at least one type of MPR on its uplink transmitted signals then the measuring node 12 may adapt the positioning measurement procedure to enhance the positioning measurement performance, which procedure may comprise of one or more of the following:

Using an enhanced receiver for performing the positioning measurement on UL signals transmitted by the wireless device 10 e.g. using interference cancellation receiver, using more than one receivers for performing measurement, etc., this may be justified e.g. by a fact that received signal strength and quality of a signal transmitted with MPR is lower and/or there may be rapid fluctuations in the transmit signal power due to applying MPR, or selecting time and/or frequency resources when MPR is not applied, or applied in the same way Adaptively selecting the time and/or frequency resources for performing measurements, e.g., determining and selecting low-interference time and/or frequency resources, e.g., in restricted measurement subframes, in positioning subframes, in subframes with reduced interference or suppressed transmissions from at least one aggressor radio node. etc.

Adapting measurement sampling to improve measurement accuracy e.g. obtaining measurement samples more frequently during the measurement period of the positioning measurement, Performing positioning measurement over a longer measurement period, e.g. 400 ms instead of 200 ms, or over a lager number of transmitted signal occasions, e.g., 150 number of SRS transmissions instead of 100 SRS transmissions, or measurement occasions than what would be used when not accounting for MPR, e.g. 200 ms. This will ensure that more measurement samples may be averaged over the longer measurement period, Adapting configuring or the usage of measurement gaps or autonomous gaps, a node cannot transmit and may be not able to receive during the gaps which would cause additional accuracy degradation which may be not acceptable when MPR is used, to ensure a required measurement accuracy and the needed number of measurement and transmission samples when MPR is used.

Adapting signals and channels, and combinations thereof, which are used for positioning measurement, e.g. use only those channels and signals less impacted by MPR Performing the positioning measurement over a wider measurement bandwidth than used when not accounting for MPR. For example, it may measure over 5 MHz, 25 RBs, or more when accounting for MPR. This in turn will enhance measurement accuracy.

Performing positioning measurement on part of the bandwidth which is least affected by the MPR e.g. A-MPR may depend upon the location of the resource blocks such as larger A-MPR on RBs at one or both of the edges of the BW.

Not performing or performing limited non-positioning measurements in order to enable the receiver to assign all or more resources for one or more positioning measurements.

Indicating to another node that the usage of MPR by the transmitting wireless device 10 has been determined.

Informing network node, e.g., positioning node or serving eNB when e.g. being a LMU, or recommending it to:

Configure or use positioning measurements which don't use uplink signals transmitted by the wireless device 10.

Configure or use positioning measurements that use uplink signals transmitted by the wireless device 10 not using MPR or using MPR in the say way, e.g., at least to avoid rapid fluctuations, e.g., transmissions in certain subframes or transmissions on another frequency or band e.g. frequency or band which is not affected or less affected by the MPR.

indicating to another node, e.g., to positioning node or to a configuring node such as serving eNB, a preferred transmission configuration adapted for the case when MPR may be used.

the informing and recommending may also be performed via indicating the measuring node's capability to deal with MPR in general or in a specific way, which may also comprise obtaining the MPR information.

The measuring node 12 may apply any of the above mentioned adaptive procedures provided the measurement accuracy of the on going positioning measurement performed on the UL transmitted signals becomes worse than a threshold e.g. worse by more than ±100 ns compared to the pre-defined accuracy.

The adaptation of any of the above mentioned procedure may be performed by the measuring node 12 based on any one or more of the following:

Based on a pre-defined rule i.e. any of the above adaptive procedure is pre-defined and to be met when certain condition is met e.g. MPR exceeds certain value and/or for certain transmission configuration, In response to a triggering event e.g. when measurement accuracy becomes worse than a threshold, Upon determining of the usage of MPR by the (transmitting) wireless device 10, Upon an implicit or explicit indication or a request to adapt received from another node, such as a O&M node, a network node, a positioning node or similar.

The method actions in the wireless device 10 for performing a positioning measurement procedure in the radio communications network according to some embodiments will now be described with reference to a flowchart depicted in FIG. 6. The actions do not have to be taken in the order stated below, but may be taken in any suitable order. Actions performed in some embodiments are marked with dashed boxes. The positioning measurement procedure is performed using at least uplink transmitted signals from the user equipment 10.

Action 601. The wireless device 10 obtains information related to a maximum power reduction applied, or a maximum power reduction expected to be applied on uplink signals transmitted from the wireless device 10. The uplink signals are used for performing at least one positioning measurement. The information may be obtained by explicitly receiving the information from a network node. The information may be obtained by receiving information about a transmission configuration of signals transmitted from the wireless device 10, and by using the received information for obtaining the maximum power reduction or a maximum power reduction expected to be applied on uplink signals transmitted by the wireless device 10. The received information may comprise at least one of: simultaneous transmission of Physical Uplink Shared Channel and Physical Uplink Control Channel, configuration of uplink carrier aggregation with or without multiple timing advance, time and/or frequency resources, modulation scheme, clustered or clustered transmissions. The information may be received from any of a positioning node or a network node.

Action 602. The wireless device 10 takes the maximum power reduction applied, or the maximum power reduction expected to be applied into account when performing the positioning measurement procedure related to the at least one positioning measurement and/or a radio transmission procedure involving uplink radio signals transmitted by the wireless device 10 to enhance positioning measurement performance of the positioning measurement procedure. The wireless device may perform the positioning measurement procedure by performing at least one of:

changing carrier frequency or frequency band used for the at least one positioning measurement procedure based on the maximum power reduction applied, or the maximum power reduction expected to be applied;

using an enhanced measurement unit at the wireless device 10 based on the maximum power reduction applied, or the maximum power reduction expected to be applied;

selecting and/or extending time interval and/or extending measurement bandwidth for the at least one positioning measurement procedure based on the maximum power reduction applied, or the maximum power reduction expected to be applied;

selecting a radio access technology less impacted by the maximum power reduction than another radio access technology;

dropping signals or carriers based on the maximum power reduction applied, or a maximum power reduction expected to be applied;

obtaining samples more frequently when the maximum power reduction applied, or the maximum power reduction expected to be applied indicates a high maximum power reduction;

stopping to perform an uplink measurement based on the maximum power reduction applied, or the maximum power reduction expected to be applied;

informing a network node for reconfiguration of the at least one positioning procedure based on the maximum power reduction applied, or the maximum power reduction expected to be applied; and adapting the at least one positioning measurement procedure to a certain percentage or certain number of transmissions without maximum power reduction or a same maximum power reduction.

In some embodiments the maximum power reduction applied, or the maximum power reduction expected to be applied is taken into account when: a condition is met; when the wireless device 10 is preconfigured to take the maximum power reduction into account; when receiving an explicit indication of the information from another node; upon determining that the maximum power reduction will be used; and/or when receiving an explicit request from a network node.

Action 603. The wireless device 10 may transmit, to a network node, such as the measuring node 12 or the network node 17, a capability of adapting the at least one positioning measurement procedure depending on maximum power reduction. The wireless device 10 may additionally or alternatively transmit to the network node, the information related to the maximum power reduction applied, or a maximum power reduction expected to be applied on the uplink signals to the network node.

Action 604. The wireless device 10 may meet one or more pre-defined requirements associated with positioning measurements which are performed on at least uplink signals transmitted by the wireless device 10, provided one or more condition related to maximum power reduction applied on said uplink transmitted signals is met.

Method in a Wireless Device 10 of e.g. Adapting Positioning Measurement Procedure Embodiments herein disclose a method in the wireless device 10 of performing one or more positioning measurements on at least its uplink transmitted signals, the method may comprise:

Obtaining information related to the MPR applied, or expected to be applied on its uplink transmitted signals which are used by the wireless device for performing at least one positioning measurements;

Adapting at least one measurement procedure related to at least one positioning measurement and/or adapting its transmission procedure;

The above example steps are elaborated below.

Method in the Wireless Device 10 of Obtaining MPR Information, as Seen in Action 601.

The wireless device 10 applies the MPR therefore it uses either pre-defined information, e.g. pre-defined MPR, P-MPR etc, and/or received information associated with the MPR, e.g. A-MPR, to determine the total amount of MPR which the wireless device 10 is applying or is expected to apply when transmitted in the uplink.

Method in the Wireless Device 10 of Using the Obtained MPR Information, an Example of Taking the MPR Applied, or the MPR Expected to be Applied into Account when Performing the Positioning Measurement Procedure, See Action 602.

Certain type of MPR, e.g. due to OOB, may vary abruptly over shorter time period e.g. from TTI to TTI. This rapid fluctuation in MPR also rapidly changes the UL transmitted power of the wireless device 10. This in turn may result in large difference in the values of the measurement samples obtained at different times by the wireless device 10 for the positioning measurement. This may eventually lead to larger inaccuracy in measurement results since samples with different values are to be average over the measurement period e.g. over 200 ms. Furthermore this also increases complexity in the UE transmitter which has to rapidly adapt its transmitted signals used for measuring the positioning measurement e.g. UE Rx-Tx time difference, propagation delay etc.

If the wireless device 10 determines that it is applying or will apply at least one type of MPR on its uplink transmitted signals then the wireless device 10 takes this into account when performing a positioning measurement procedure, for example, the wireless device 10 may adapt the positioning measurement procedure to enhance the positioning measurement performance, which procedure may comprise of one or more of the following:

- Uses an enhanced measurement unit in the transmitter for performing the positioning measurement on UL signals transmitted by the wireless device e.g. uses a measurement unit which is capable of handling rapid fluctuation in the uplink transmit power when performing a positioning measurement and/or handling weak signals due to applying MPR,
- Adaptively selecting the time and/or frequency resources for performing measurements, e.g., determining and selecting low-interference time and/or frequency resources, e.g., in restricted measurement subframes, in positioning subframes, in subframes with reduced interference or suppressed transmissions from at least one aggressor radio node, etc., or selecting time and/or frequency resources when MPR is not applied, or applied in the same way,
- Adaptively select carriers and/or RATs which are less impacted by MPR,
- Selectively drop certain channels/signals/carriers to require less MPR. E.g. if the device is configured with UL carrier aggregation and should transmit multiple SRS, it could drop some SRS,
- Adapts measurement sampling to improve measurement accuracy e.g.
  - Obtains measurement samples more frequently during the measurement period of the positioning measurement.
  - Obtains measurement samples at the occasion when no MPR is applied, or smaller MPR is applied, or at occasions when the applies MPR is the same or is within a range e,g, within 1 dB.
- Performs the positioning measurement over a wider measurement bandwidth than used when not accounting for MPR. For example it may measure over 5 MHz (25 RBs) or larger measurement BW when accounting for MPR. This in turn will enhance measurement accuracy.
- Performs positioning measurement over a longer measurement period, e.g. 400 ms, than used when not accounting for MPR (e.g. 200 ms). This will ensure that more measurement samples can be averaged over the longer measurement period.
- Adapting configuring or the usage of measurement gaps or autonomous gaps, the wireless device 10 cannot transmit and may be not able to receive during the gaps which would cause additional accuracy degradation which may be not acceptable when MPR is used, to ensure a required measurement accuracy and the needed number of measurement and transmission samples when MPR is used.
- The wireless device 10 performs one or more of the following tasks provided applied MPR is above a threshold and/or MPR changes by certain margin over certain time period e.g.
  - stops performing a positioning measurement which uses UL transmitted signals,
  - uses only positioning measurement which uses downlink signals for positioning. For example it performs and uses any combination of A-GNSS measurements, GNSS measurements, RSRP, RSRQ, OTDOA RSTD measurements etc for one or more of the following tasks: for reporting positioning for MDT, for determining its location itself, wireless device based positioning etc.
  - informs network node that applied MPR is above a threshold and/or MPR changes by certain margin over certain time period and/or accuracy of positioning measurements is below a second threshold,
- Informing network node, e.g., serving node or positioning node, or recommending it to:
  - Configure or use positioning measurements which don't use uplink signals transmitted by the wireless device 10,
  - configure or use positioning measurements that use uplink signals transmitted by the wireless device 10 and not using MPR or using less MPR or using MPR in the same way, e.g., at least avoid rapid fluctuations, e.g., the transmissions in certain subframes or transmissions on another frequency or band e.g. frequency or band which is not affected or less affected by the MPR.
  - Reconfigure UL transmissions and/or measurements,
  - Use a preferred transmission and/or measurement configuration which may be pre-defined or indicated by the wireless device 10.

The wireless device 10 may apply any of the above mentioned adaptive procedures provided the measurement accuracy of the on going positioning measurement performed on the UL transmitted signals becomes worse than a threshold e.g. worse by more than ±100 ns compared to the pre-defined accuracy.

The wireless device 10 may also adapt its transmission procedure when MPR is used, which may comprise, e.g.:

- Ensuring a certain number or percentage of transmissions without MPR or with the same MPR, to avoid fluctuations, over a time period
- Ensuring that the number or percentage of uncertain transmissions is below a threshold (e.g., with not transmitted signals that are configured and/or transmissions with MPR applied when the measuring node is not aware of the actual exact transmissions, which makes the transmissions uncertain for the measuring node)
- Adapting measurement gap and/or autonomous gap configuration to meet a certain transmission configuration criteria when MPR is used (e.g., to minimize the impact of MPR on UL transmissions)

The adaptation of any of the above mentioned measurement and/or transmission procedures is performed by the wireless device based on any one or more of the following:

- Based on a pre-defined rule i.e. any of the above adaptive procedure is pre-defined and to be met when the corresponding condition is met e.g. MPR exceeds certain value,
- In response to an explicit indication received from another node e.g. from positioning node,
- In response to a triggering event e.g. when measurement accuracy becomes worse than a threshold,
- Upon determining that MPR is used or will be used.

Figure 7:
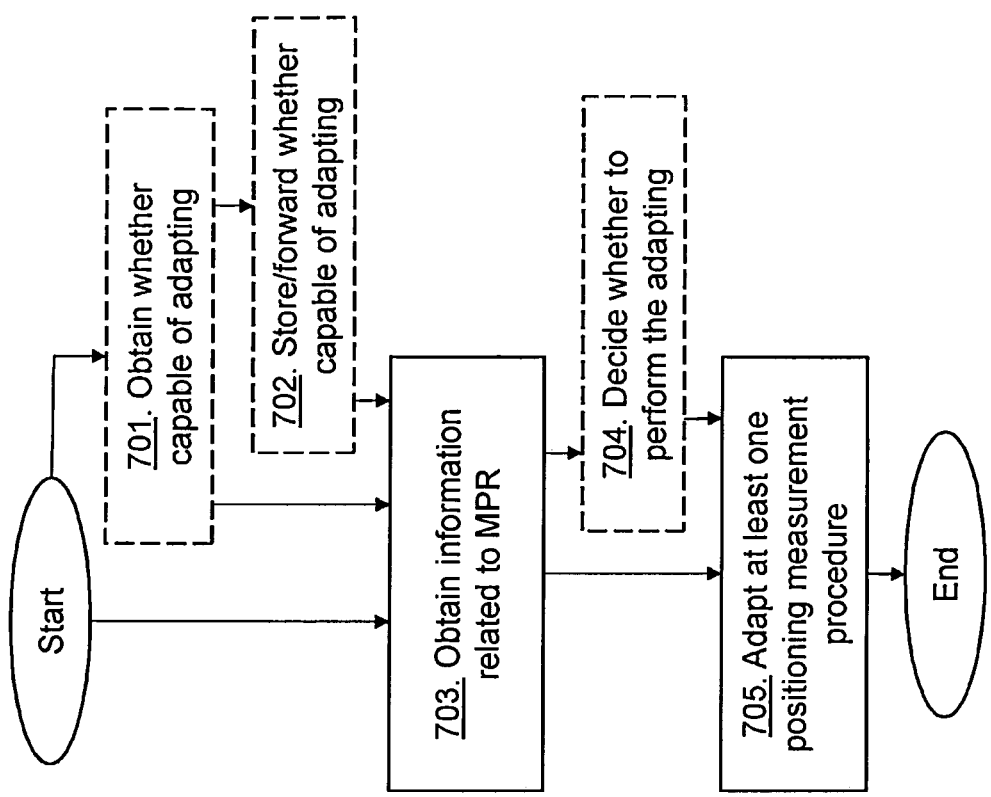
FIG. 7: A flow chart depicting a method in a network node

The method actions in the network node 17, e.g. positioning node, radio base station, eNB, RNC, measuring node, for enabling positioning of the wireless device 10, and/or configuring the wireless device 10 and/or the measuring node 12 for performing a positioning measurement according to some embodiments will now be described with reference to a flowchart depicted in FIG. 7. The actions do not have to be taken in the order stated below, but may be taken in any suitable order. Actions performed in some embodiments are marked with dashed boxes.

Action 701. The network node 17 may obtain whether the measuring node 12 or the wireless device 10 is capable of adapting the at least one positioning measurement procedure depending on maximum power reduction.

Action 702. The network node 17 may further store whether the measuring node 12 or the wireless device 10 is capable of adapting. The network node may additionally or alternatively forward whether the wireless device 10 is capable of adapting to the measuring node 12.

Action 703. The network node 17 obtains information related to a maximum power reduction applied, or a maximum power reduction expected to be applied on uplink signals transmitted by the wireless device 10. The uplink signals are used by the wireless device 10 and/or measurement node 12 for performing at least one positioning measurement. The information may be obtained implicitly, explicitly, or from a combination of both. For example, the network node 17 may receive information about a transmission configuration of signals transmitted from the wireless device 10, and may use the received information for obtaining the maximum power reduction or a maximum power reduction expected to be applied on uplink signals transmitted by the wireless device 10. The received information may comprise at least one of: simultaneous transmission of Physical Uplink Shared Channel and Physical Uplink Control Channel, configuration of uplink carrier aggregation with or without multiple timing advance, time and/or frequency resources, modulation scheme, clustered or clustered transmissions. Furthermore, the information may be received from any of a network node or the wireless device 10 and/or the information may be transmitted to a measuring node or the wireless device.

Action 704. The network node 17 may decide whether to perform the adapting below based on whether the wireless device 10 is capable of adapting or not.

Action 705. The network node 17 adapts at least one positioning measurement procedure related to the at least one positioning measurement, based on the maximum power reduction applied, or the maximum power reduction expected to be applied, to enhance positioning performance. The adaptation comprises one or more of: adapting parameters related to the at least one positioning measurement using uplink signals transmitted by the wireless device 10; switching to a positioning method which does not require a measurement on uplink signals transmitted by the wireless device 10; and discarding a positioning measurement that use uplink signals transmitted by the wireless device 10. The network node 17 may adapt the at least one positioning measurement procedure when the maximum power reduction applied, or the maximum power reduction is expected to be applied is above a threshold. The adapting of parameters may comprise to reconfigure the wireless device 10 to a configuration with less impact of the maximum power reduction.

Method in the Network Node 17 of e.g. Adapting Positioning Measurement Procedure The examples below are provided for the network node 17. The network node 17 may be a positioning node, but the examples may apply to any network node with a positioning functionality, e.g., also to an eNB or an RNC that are capable of configuring UL transmissions and/or measurements for positioning, a coordinating node such as SON node or O&M configuring and/or maintaining configuration related to positioning.

Embodiments disclose a method in a network node, e.g., positioning node such as E-SMLC or radio network node with positioning functionality such as configuring transmissions and/or measurements for positioning e.g. serving eNodeB or RNC, configuring the wireless device 10 and/or the measuring node 12 for performing one or more positioning measurements and/or determining the position of the wireless device 10. Embodiments herein disclose:

Obtaining information related to the MPR applied, or expected to be applied on uplink signals transmitted by the wireless device 10 which the wireless device 10 and/or measuring node 12 is using or may use for performing at least one positioning measurements, see action 703;

Adapting at least one measurement procedure related to at least ne positioning measurement, see 705, which adaptation comprises e.g.

Adapting one or more parameters related to the positioning measurement which uses UL signals transmitted by the wireless device 10

Switching to a positioning method which does not require measurements on UL signals transmitted by the wireless device 10

Fully or selectively discarding positioning measurements which use UL signals transmitted by the wireless device 10 when MPR is used and/or MPR is above a certain limit and/or signal fluctuations are expected due to dynamic MPR The above mentioned steps are elaborated below.

Method in a Network Node of Obtaining MPR Information, Relating to Action 703

The network node 17, e.g. a positioning node, may obtain information related to the MPR being applied, or is expected to be applied by the wireless device 10 on its UL transmitted signals based on. Implicit indication mechanism, Explicit indication mechanism or a Combined mechanism of both explicit and implicit indication.

Implicit Indication Mechanism

According to this embodiment the network node 17 autonomously determine the MPR applied, or is expected to be applied by the wireless device 10 on UL transmitted signals.

The MPR depends upon the radio transmission configuration parameters used by the wireless device 10 for uplink transmission. This relation is pre-defined in the standard and is used by the wireless device 10 when applying the MPR or at least certain type of MPR e.g. to meet OOB emission requirements. Therefore in one example the network node 17 may use pre-defined information related to the MPR and also information related 25 to the radio transmission configuration of the signals transmitted by the wireless device 10 e.g. UL transmission BW, frequency band, modulation of signals transmitted by the wireless device 10, OFDM, single-carrier, SC_FDMA, clustered transmissions, channel and signal combinations, e.g. simultaneous PUSCH and PUCCH transmission, UL carrier aggregation configuration, etc.

In another example the network node 17 based on the deployment scenario of the cell and frequency band in which the wireless device 10 is operating may determine whether the wireless device 10 is applying or may apply certain MPR. For example in certain co-existence scenario e.g. between band 13 (700 MHz) and public safety band in 700 MHz range the wireless device 10 may apply large A-MPR.

In yet another example the network node 17 implicitly determines the amount of MPR applied, or is being applied by the wireless device 10 by comparing:

the performance of a positioning measurement performed using at least UL signals transmitted by the wireless device with the same type of a reference positioning measurement i.e. also performed using at least UL signals transmitted by the wireless device 10 under similar conditions as the actual measurement If the performance of the actual positioning measurement is worse than the reference measurement by certain margin e.g. worse by more than 200 ns then the network node 17 may assume that the wireless device 10 is applying MPR or is applying MPR which degrades the positioning measurement performance.

Explicit Indication Mechanism

According to this mechanism the network node 17 may receive the amount of MPR or at least certain type of MPR and its value applied by the wireless device 10 from any of the following means:

Wireless device 10 applying the MPR e.g. via LPP

Network node 17 which is aware of the MPR which is applied, or may be applied by the wireless device 10. Examples of network nodes are serving radio network node of the wireless device 10 etc.

For example eNode B can signal the A-MPR, which is applicable to certain band, to the network node 17. The same value of the A-MPR may also signaled by the radio network node to the wireless device 10 operating in the cell served by the radio network node.

The network node 17 may also indicate the cell identifiers e.g. PCI, CGI of all cells in which the same A-MPR is applied by the wireless device 10 for that band. That is the A-MPR values signal to the wireless devices in these cells. As explained earlier that A-MPR is cell specific.

Combined Mechanism

In a combined method the network node 17 may use the implicit and explicit information related to the MPR to more accurately determine the actual value of the MPR applied by or will be applied by the wireless device 10.

In another example the network node 17 may only receive an indication from the radio node and/or from the wireless device 10 that the wireless device 10 is or will apply MPR or certain type of MPR. Upon receiving this indication the network node 17 implicitly determines the actual value of the MPR that the wireless device 10 is or may apply as explained with few examples in section above.

Method in the Network Node 17 of Adapting Positioning Measurement Procedure, Relating to Action 705

As stated above the network node 17 may perform one or more of the following tasks if it determines that the wireless device 10 is applying MPR or is expected to apply MPR and/or if the MPR is above a threshold e.g. larger than 3 dB.

Method of Adapting Positioning Measurement Configuration Parameters

The network node 17 while taking into account the MPR may modify, adapt or configure one or more configuration parameters which are used by the wireless device 10 and/or by the measuring node 12 for performing one or more positioning measurement which uses at least UL signals transmitted by the wireless device 10. The adaptation of one or more said parameters is performed to enhance or at least prevent degradation of the one or more positioning measurements when the wireless device 10 applies the MPR.

Examples of adaption of the configuration parameters for positioning measurements are:

Configuring or requesting to configure, e.g. a positioning node may request a serving eNB to configure transmissions in certain resources based on the transmission pattern in other eNBs, time and/or frequency resources, e.g., positioning subframes or low-interference subframes, with preferred interference conditions to avoid full-power transmissions and thus avoid applying MPR, and/or transmissions in certain time and/or frequency resources to avoid or minimizing applying MPR, transmission modes and modulation schemes, e.g. OFDM, single-carrier, SC-FDMA, clustered transmissions, etc. Transmission modes could be ordered according to their required MPR and instead of configuring certain modes all modes below/beyond a required MPR could be allowed/forbidden, reduced number of configured/activated UL carriers.

Configuring measurement bandwidth to avoid using MPR for transmissions which will be configured over a bandwidth adaptively to the measurement bandwidth Increasing the measurement bandwidth of the positioning measurement to reduce the power density, Reducing the measurement bandwidth to avoid transmissions on edge RBs Increasing the number of measurement occasions or periodicity of the measurement reports so that the measuring node 12 and/or wireless device 10 can measure over a longer measurement period, between the reports, thereby enhancing the accuracy.

Requesting a larger number of UL transmissions, e.g., from the serving eNB, for positioning when MPR is used Configuring one or more higher layer time domain filtering parameters to enable the measuring node 12 and/or wireless device 10 to perform more filtering of the measurement thereby enhancing the accuracy.

Configuring measuring node 12 and/or wireless device 10 to perform measurement also on secondary carriers when using CA. This enables the measuring node 12 and/or wireless device 10 to obtain more measurements thereby enhancing positioning accuracy.

Configuring measuring node 12 and/or wireless device 10 to perform measurement on a carrier which belongs to a frequency band which has better uplink coverage. Consider that the wireless device 10 is configured with carrier aggregation with PCell and SCell on 2 GHz and 900 MHz respectively. The latter carrier has a better coverage than the former one. For example the network node 17 such as a positioning node may configure the measuring node 12 and/or wireless device 10 to perform positioning measurement on signals transmitted on carrier operating in 900 MHz instead of 2 GHz. This enables the measuring node 12 and/or wireless device 10 to obtain more accurate measurements thereby enhancing positioning accuracy.

The network node 17 e.g. positioning node may also request the serving radio node of the wireless device 10 to change the serving cell, or PCell in case of CA, to a frequency which has a better coverage than that of the current PCell. For example the network node 17 may request it to perform cell change of the wireless device 10 from the current serving cell on 2 GHz to a new serving cell at 900 MHz frequency band. The network node 17 may also indicate the reason of the request for changing the serving cell of the wireless device e.g. due to applied MPR, which degrades the positioning measurement accuracy. In response the serving node may perform the cell change as requested by the network node 17.

The network node 17 sends the positioning measurement configuration containing the adapted parameters to the measuring node 12 and/or wireless device 10, which in turn use them to perform one or more configured positioning measurements according to 15 at least the received adapted configuration parameters.

Switching Between Positioning Methods

According to this adaptation mechanism the network node 17 such as the positioning node selects a positioning for determining the positioning of the wireless device 10, wherein the selected method is the one:

- which do not require or use positioning measurements which are performed on UL signals transmitted by the wireless device 10. For example this can be one of the methods which uses positioning measurements performed by the wireless device 10 on downlink signals such as OTDOA, A-GLASS or
- which may use positioning measurements which are performed on at least UL signals transmitted by the wireless device 10 but their accuracy has least impact of the MPR applied by the wireless device 10 e.g. MPR has less impact on the UE Rx-Tx time difference compared to the UL RTOA measurement performed by the LMU or
- which uses positioning measurements which are performed on at least UL signals transmitted by the wireless device 10 as well as those measurements which don't use UL signals transmitted by the wireless device 10. This combined method improves the overall positioning accuracy.

The network node 17 sends updated positioning request to at least the wireless device 10 and/or to the measuring node 12 for performing one or more positioning measurements based on the selected positioning method accounting for the MPR being applied, or expected to be applied by the wireless device 10.

Discarding or Avoiding of Positioning Measurements Using UL Signals

According to this mechanism the network node 17 may selectively or fully discard or avoid one or more positioning measurements performed on at least UL signals transmitted by the wireless device 10 while accounting for the MPR applied by the wireless device 10. The network node 17 may consider the positioning measurement results unreliable due to the applied MPR or when MPR is applied differently, e.g., in different time resources. The discarding of a measurement means that the network node 17 does not use it for determining the location of the wireless device 17. This is described with few examples e.g.

- In one example if the obtained value of the MPR being applied by the wireless device 10 is above a threshold, e.g. more than 6 dB, and/or MPR is varies by certain margin, e.g. 3 dB, over certain time period, e.g. within 50 ms, then positioning fully discard any positioning measurement which is performed on at least UL signals transmitted by the wireless device 10.
- In another example if the obtained value of the MPR being applied by the wireless device 10 is above a threshold, e.g. more than 6 dB, then the network node 17 may only discard the positioning measurement, i.e. selective discarding, provided the frequency band is above 1 GHz and/or measurement BW is smaller than a threshold, e.g. 10 MHz.
- In another example, if MPR is applied in certain time and/or frequency resources or applied differently in some resources, the measurements in these resources may be discarded or avoided Method of Enhancing Positioning by Adapting Radio Transmission Procedure According to some embodiments when the applied MPR or expected MPR on UL signals is above a threshold and one or more positioning measurement is performed by the wireless device 10 and/or by the measuring node 12 on UL signals transmitted by the wireless device 10 then one or more radio transmission procedures are adapted in order to reduce, minimize or alleviate MPR. The method may be implemented in a radio network node serving the wireless device 10, e.g., eNB or RNC, and/or by the wireless device 10 as explained below.

Method in a Radio Network Node, Such as a Measuring Node 12 for Example an eNodeB or RNC Serving the Wireless Device 10, of Adapting Radio Transmission Procedure In this method the radio network node, e.g. eNode B, serving the wireless device 10 may modify, change or reconfigure one or more radio transmission procedures related to UL signals, which adaptation lead to at least reduction or avoiding of the MPR applied by the wireless device 10 on UL signals or avoiding at least one MPR.

Examples of Radio Transmission Procedure Adapted by, the Radio Network Node, Such as the Measuring Node 12 or the Network Node 17

One or more of the following radio transmission procedures can be adapted by the radio network node serving the wireless device 10:

- Configuring the wireless device 10 with UL multi-antenna transmission using beamforming. This will enable wireless device 10 to operate each of its PA below the nominal maximum output power, e.g. 21 dBm per PA for 2×2 UL MEMO or Closed Loop Transmit Diversity (CLTD). This in turn will prevent the wireless device 10 to apply MPR since it is applies when it operates its PA at 24 dBm.
- Configuring the wireless device 10 to operate only with single RAT at a time thereby preventing the wireless device 10 from applying MPR due to simultaneous multi-RAT operation.
- Configuring the wireless device 10 capable of multi-SIM multi-call, e.g. dual SIM dual call, not to operate on more than one SIM while the positioning measurement is performed by the wireless device 10 and/or by the measuring node 12.
- Configuring the wireless device 10 to operate on a carrier and/or band which would require less or no MPR to meet co-existence requirements with another system and/or band.
- Scheduling UL data and/or control channel transmission on resource blocks and/or using transport format, e.g. modulation type/scheme and coding scheme, which lead to lower MPR for the wireless device's UL signals.
- Controlling the network-configurable parameters related to output power and/or MPR, while taking into account MPR, to reduce or avoid dropping UL transmissions, e.g., SRS transmissions, when the UL transmissions may be used or were requested for positioning
  - According to the current standard, SRS transmissions may be dropped when there are other UL transmissions on-going, e.g., PUSCH, and the Pcmax level, which is also a function of MPR, would be exceeded, with one or multiple TAGs
- Configuring transmissions which are not used for positioning measurements, e.g., UL data transmissions in multi-clusters while using SRS for positioning, to fully or partially avoid or minimize, e.g., over a certain time period, during the positioning session, or during UL transmissions for positioning. Example: avoid multi-cluster transmissions during an UL positioning session.
- Selecting and configuring a certain type of signals /channels for positioning to avoid or reduce MPR, e.g., avoid using PUSCH-based UL measurements which may cause increased MPR if the UE applies MPR, Configuring transmission bandwidth to avoid MPR, e.g., Increase the BW to reduce the power density, or Reduce the transmit bandwidth to avoid transmissions in edge resource blocks.

Adapting the transmit configuration to ensure that transmit power density does not increase a threshold in all or a subset of time and/or frequency resources, e.g., close to the frequency channel edge, Scheduling UL transmissions in time and/or frequency resources with better propagation and/or interference conditions and thereby avoiding configuring MPR. This may also imply determining, selecting, and configuring such time and/or frequency resources; also applying interference coordination in one or more radio network nodes to ensure the interference conditions.

Adapting a power control scheme or at least one UL power control parameter for UL transmissions to avoid or minimize using MPR, e.g., by avoiding the wireless device 10 transmitting at full power by adaptively configuring the pathloss compensation factor $\alpha_c \in \{0, 0.4, 0.5, 0.6, 0.7, 0.8, 0.9, 1\}$ defined in TS 36.213 section 5.1.1.1 version 11.0.0.

Configuring UL transmissions, e.g., when positioning is on-going or will start while using at least UL signals or when the UL transmissions were specifically requested for positioning e.g. for UTDOA, such that one or more of the following hold:
the number or percentage of transmissions without MPR or with the same MPR, to avoid fluctuations, over a time period is above a threshold,
the number or percentage of transmissions with MPR or with varying MPR is below a threshold,
the total or an average amount of MPR over a period or for a number of transmissions does not exceed a threshold.

Adapting transmission configurations with less carriers, e.g. no UL carrier aggregation or UL carrier aggregation with fewer carriers.

Triggering Condition for Adapting Radio Transmission Procedure

The adaptation may be performed always or at certain conditions, e.g., when the MPR information is not available or incomplete at the measuring node 12 or when it exceeds a certain level.

The radio network node, such as the serving eNodeB or RNC may perform adaptation based on one or more of the following:
Autonomous decision by itself e.g. when the radio network node discovers that positioning measurement is being performed on UL signals transmitted by the wireless device 10 and MPR applied by the wireless device 10 is above a threshold
Explicit request received from a positioning node
Explicit request received from the measuring node 12 performing said positioning measurement(s)
Explicit request received from the wireless device 10 whose at least UL signals are used for performing said positioning measurement(s)
Pre-defined rule. For example it is required to adapt certain radio transmission configuration for a certain positioning method, e.g., UL positioning or UTDOA, or when a certain type of positioning measurement is performed on UL signals e.g. when UL RTOA is performed by LMU, etc.

Method in the Wireless Device 10 of Adapting Radio Transmission Procedure

In this method the wireless device 10 may modify, change or reconfigure one or more radio transmission procedures which lead to at least reduction or avoiding of the MPR applied by the wireless device 10 on UL signals.

The adaptation may be performed by the wireless device either always or when the MPR information is not available or there is incomplete information or ambiguity regarding the MPR to be applied.

Examples of Radio Transmission Procedure Adapted by Wireless Device 10

One or more of the following radio transmission procedures can be adapted by the wireless device 10:
Switching autonomously to UL multi-antenna transmission using beamforming e.g. open loop UL multi-antenna scheme such as OLTD with beamforming which does not require explicit feedback from the serving node. This will enable wireless device to operate each of its PA below the nominal maximum output power, e.g. 21 dBm per PA for 2×2 UL MIMO or CLTD. This in turn will prevent the wireless device to apply MPR since it is applies when it operates its PA at 24 dBm.
Configuring autonomously to operate only with single RAT at a time thereby preventing from applying MPR due to simultaneous multi-RAT operation when the wireless device is performing a positioning measurement.
Configuring autonomously to operate on only one SIM if the wireless device 10 supports multi-SIM multi-call operation while the positioning measurement is performed by the wireless device 10.
Dropping scheduled transmissions that may lead to higher MPR or varying MPR during an UL positioning session, e.g., not transmitting multi-cluster transmissions, dropping certain channelsisignals in simultaneous transmissions, using lower-MPR modulation schemes instead, e.g. drop OFDM or use SC-FDMA instead.

Triggering Condition for Adapting Radio Transmission Procedure

The wireless device 10 may perform the adaptation based on one or more of the following principles:
Autonomous decision by itself e.g. when the wireless device 10 is performing a positioning measurement on at least its UL transmitted signals and the MPR applied on the UL signals is above a threshold
Explicit request received from a positioning node
Explicit request received from the measuring node 12 performing said positioning measurement(s)
Explicit request received from its serving radio network node
Pre-defined rule. For example it may be pre-defined that the wireless device 10 may adapt certain radio transmission configuration provided:
Certain type of positioning measurement is performed on UL signals by the wireless device 10 e.g. UE Rx-Tx time difference measurement.
Certain type of positioning measurement is performed on UL signals by the wireless device 10 and MPR is above a threshold e.g. UE Rx-Tx time difference measurement and MPR is 5 dB or more.
the absolute UL transmit power level of the wireless device 10 is above a threshold Method in Meeting Pre-defined Requirements Under Adaptation of Positioning Measurement Procedure This embodiment describes methods in the wireless device 10 and/or the measuring node 12 of:

Performing one or more positioning measurements on at least UL signals transmitted by the wireless device 10, which positioning measurement is used for determining the position of the wireless device 10;

Meeting one or more pre-defined requirements associated with positioning measurements which are performed on at least UL signals transmitted by the wireless device 10 provided one or more condition related to MPR applied on the UL transmitted signals is met.

Examples of pre-defined requirements are: measurement accuracy, measurement period over which accuracy is to be met, measurement reporting delay, evaluation periods, cell identification reporting delay, number of cells over which one or more position measurement is done over a measurement period, etc.

Examples of one or more conditions related to MPR, applied at least on the UL transmitted signals, under which the pre-defined requirements are to be met are:

Condition that the overall or average MPR, for any reason or for a specific reason e.g. due to multi-cluster transmissions, should not be larger than a first threshold over a positioning measurement period or for a certain number of measured signal samples Condition that the number or percentage of transmissions without MPR is above a threshold Condition that the number or percentage of transmissions with the same MPR, to avoid fluctuations, over a time period is above a threshold Condition that the number or percentage of transmissions with a known MPR is above a threshold Condition that the number of uncertain measurement occasions is below a threshold, where at least one uncertain measurement occasion may comprise a radio signal transmitted with MPR, in general or with MPR of a specific type, e.g., time-varying MPR. In another example, an uncertain measurement occasion may also comprise an occasion when either a configured UL transmission is not transmitted or it is transmitted with MPR of which the measuring node is not aware of.

Condition that if measurement BW of the positioning measurement is larger than a certain value, e.g. 10 MHz or above, then MPR should not be larger than a threshold over a positioning measurement period, The MPR depends upon channel bandwidth and also on number and location of resource blocks in frequency domain.

It may also be pre-defined that if the MPR is above first threshold then the wireless device 10 or measuring node 12 shall meet second set of pre-defined requirements otherwise it shall meet the first set of pre-defined requirements for the positioning measurements. One or more second set of pre-defined requirements may be more relaxed than the corresponding first set of pre-defined requirements.

For example, the second set of measurement period may be longer than the first set of measurement period for the same type of positioning measurement. However, some of the requirements may be the same, e.g., second set and first set of measurement accuracies may be the same. A longer second set of measurement period may also depend upon one or more factors such as the type of MPR, e.g. A-MPR, P-MPR etc, variation of MPR over time etc.

One or more rules may be pre-defined to ensure that the wireless device 10 and/or measuring node 12 meet at least second set of requirements. For example it may be pre-defined that if the wireless device 10 and/or measuring node 12 are performing a positioning measurement, e.g. UL RTOA, on UL signals, e.g. SRS, and the MPR is above a threshold then the measurement period of the positioning measurement, e.g. UL RTOA, is extended by certain margin.

The above rules may apply to requirements pertaining to intra-frequency, inter-frequency, carrier aggregation/multi-carrier or inter-RAT positioning measurements, which use at least UL signals.

In order to meet the above mentioned requirements the wireless device 10 and/or measuring node 12 may be required to implement additional circuitry such as memory unit, processing unit and control unit.

Method of Obtaining Capability of Enhancing Positioning Measurement Performance Accounting for UE MPR According to some embodiments the positioning node being an example of the network node 17 obtains the capability of the measuring node 12, of a configuring node such as the measuring node 12 e.g., serving eNB, or RNC configuring positioning measurements or UL transmissions for positioning purpose, or of the wireless device 10, which capability indicates whether the measuring node 12 or the wireless device 10 is:

Capable of adapting one or more positioning measurement procedures depending upon the MPR applied on the UL signals transmitted by the wireless device 10 and when the positioning measurement is performed on at least the UL signals and/or Capable of adapting one or more radio transmission procedures depending upon the MPR applied on the UL signals transmitted by the wireless device 10 and when the positioning measurement is performed on at least the UL signals.

Figure 6:
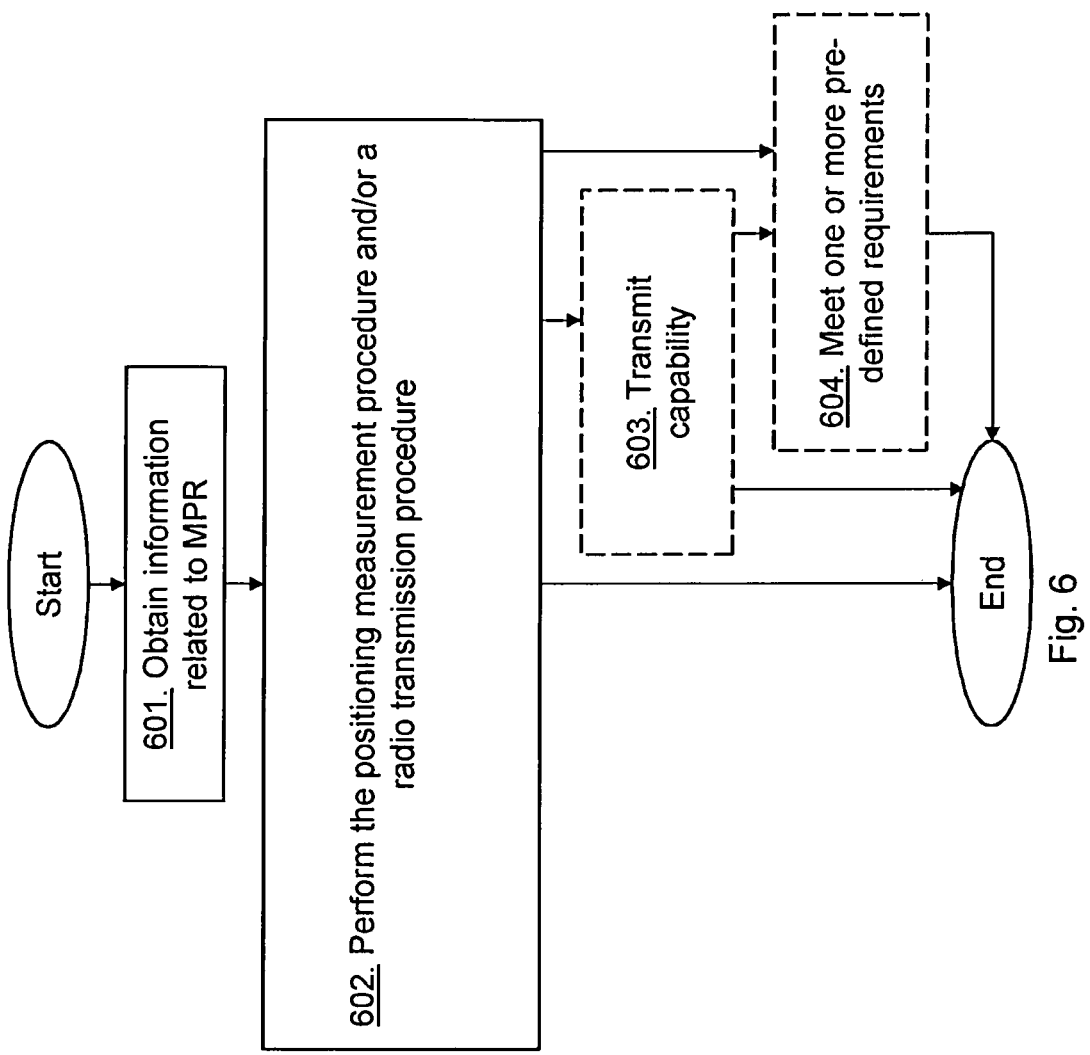
FIG. 6: A flow chart depicting a method in a wireless device

The obtained capability information may also contain additional information or parameters described in preceding sections, e.g. section on adaptation of positioning measurement procedures and section on adaptation of radio transmission procedures, Mechanism of Obtaining Wireless Device and/or Measuring Node Capability Any of the information related to the capability disclosed above can be obtained by the positioning node through implicit or explicit means or combination thereof, This is also shown in action 603 in FIG. 6.

Implicit Mechanism

According to this embodiment the positioning node use any implicit information related to a positioning measurement which is performed on at least UL signals transmitted by the wireless device 10. For example if the positioning node is aware that the wireless device 10 is applying MPR or if MPR is above a threshold but the pre-defined measurement requirements of the positioning measurement performed by the wireless device 10 is met, then it may be assumed that the wireless device 10 is capable of adapting the positioning measurement procedure.

Explicit Mechanism

According to some embodiments, the positioning node obtains the information related to the above mentioned capability of the wireless device 10 and/or of the measuring node 12 by receiving an explicit indication from the wireless device 10 and/or from the measurement node 12 and/or from another node, e.g. serving radio node of the wireless device, which contains the wireless device capability information. Examples of other network nodes are eNode B, relay, base station, O&M, OSS, SON, MME, core network node etc. For example serving eNode B may forward the wireless device 10 capability information to the positioning node using LPPa. Similarly the wireless device 10 may send its capability to the positioning node using LPP. The measuring node 12 such as LMU may signal its capability directly to the positioning node.

The measuring node 12 or wireless device 10 may send the above mentioned capability information to the positioning node in any of the following manner:

Proactive reporting without receiving any explicit request from the positioning node, e.g. E-SMLC. For example whenever wireless device 10 or measuring node 12 communicates with positioning node over LPP.

Reporting upon receiving any explicit request from the positioning node.

The explicit request can be sent by the positioning node to the measuring node 12 and/or network node 17 and/or to the wireless device 10 anytime or at any specific occasion. For example the request can be sent when positioning request is triggered for determining the location of the wireless device 10 e.g. by the wireless device 10 and/or by a core network node e.g. MME 18.

In case of proactive reporting the wireless device 10 or measuring node 12 may also report its capability information during one or more of the following occasions:

During initial setup or call setup e.g. when establishing the RRC connection

During cell change e.g. handover, primary carrier change in multi-carrier 25 operation, PCell change in multi-carrier operation, RRC re-establishment, RRC connection release with redirection etc.

Whenever it is configured by the serving node to operate in UL multi-cluster transmission, OFDM, simultaneous transmission of multiple channels/signals, e.g. PUSCH and PUCCH, UL carrier aggregation.

Action in Positioning Node, as an Example of the Network Node 17, Upon Obtaining Capability Information The positioning node upon obtaining the above mentioned capability information may use it for one or more purposes. For example the positioning node may perform one or more of the following tasks:

May use the above mentioned obtained capability information of the wireless device 10 to decide whether to adapt one or more parameters related to positioning measurements which use at least UL signals transmitted by the wireless device 10. For example if the wireless device 10 is capable of adapting positioning measurement procedure and can meet the requirements when MPR exceeds a threshold, then positioning node may not configure measurement BW larger than a certain bandwidth, e.g., 5 MHz, Measurement over larger BW improves measurement accuracy but it also increases power consumption. Therefore if wireless device 10 is capable of adapting positioning measurement procedure then the positioning node does not have to request wireless device 10 to measure over larger BW, e.g. 10 MHz or more, to compensate for MPR.

May use the above mentioned obtained capability information to decide whether to switch to a positioning method which does not require measurements on UL signals transmitted by the wireless device 10. The positioning node may decide to switch to a positioning method which uses only measurements on DL signals if the wireless device 10 and/or measuring node 12 is not capable of adapting positioning measurement procedure to account for the MPR applied on the UL signals transmitted by the wireless device 10.

May store the obtained information and use it also in future operation. In this way the positioning node may not have to obtain this information again thereby reducing the signaling overheads, The stored information may be further used for collecting the statistics about the wireless device 10 in the area, e.g., to determine the common device type or configuration, and configure one or more positioning procedures or measurements or allocation radio resources, adaptively to this statistics.

May forward the obtained capability information of the wireless device 10 to one or more measuring nodes, e.g. LMU, which may use it for adapting its parameters related to the receiver which is used for performing the UL positioning measurements.

Methods in the Network Node 17, being a Positioning Node, of Using the MPR Information for Positioning Purpose According to some embodiments, the positioning node obtains MPR information, in its general sense—see e.g. above, and uses it for at least one of the below:

Obtaining device location by using RF fingerprinting positioning, pattern matching, Adaptive enhanced cell identity positioning (AECID), or E-CID Correcting positioning measurements (e.g., UL received signal strength) for the same or another wireless device, e.g., Prior storing in a positioning-related database, e.g., AECID database, and/or using for finding the device's location The measurement and the MPR information may be received from the same or different nodes, e.g., from LMU and eNB/device, respectively, Storing in a database, with or without the corresponding measurement performed when MPR was applied Obtaining propagation characteristics, pathloss, e.g., as a measurement for an individual wireless device 10 or for building up a pathloss or propagation model, or a distance for the wireless device 10 based on MPR information and a measurement comprising at least UL component Sending the MPR information to another node, e.g., for performing UL measurements, e.g., to LMU or another eNB—see also above Building up the assistance data for positioning measurements, e.g., inclusion of the MPR information if it is applied, configuring time and/or frequency resources for measurements, Selecting measuring nodes, e.g. the measuring node 12, to perform UL measurements on radio transmissions from the wireless device 10, e.g., LMUs at a larger distance from the transmitting wireless device 10 may be selected when MPR is not applied, Positioning method (re)selection The methods of obtaining the MPR information may be based on acquiring a pre-defined or configured value, calculation, received signaling from another node, acquiring from internal or external database, selecting from two or more pre-defined or configured values. Some further examples of obtaining are shown above.

Advantages with embodiments herein

The positioning measurement requirements may be met even when wireless device 10 applies one or more type of MPR Some methods enable that positioning accuracy may not be degraded even when wireless device 10 applies large MPR Some methods allow alternate mechanism to determine the position of the wireless device 10 if the MPR applied by the wireless device 10 on its UL transmitted signals is large Some methods enable positioning node to be aware of the MPR applied by the wireless device 10 enabling it to adapt parameters or select an alternate positioning method, Some methods enable measuring node 12 to be aware of the MPR applied by the wireless device 10 enabling it to adapt its receiver/measurement parameters to enhanced the positioning measurement performance, Using an Enhanced Receivers An enhanced receiver which is interchangeably called as advanced receiver may be used at the wireless device 10, as well as at the radio network node, e.g. LMU; BS, etc., such as the measuring node 12 and the network node 17, for improving the reception of the received wanted radio signals.

A well-known example of an advanced receiver is a Minimum Mean Square Error-Interference Rejection Combining (MMSE-IRC). An example of more sophisticated advanced receiver is Minimum Mean Square Error-turbo Interference Cancellation (MMSE-turbo IC), which is capable of performing non-linear subtractive-type interference cancellation; this can be used to further enhance system performance. Even use of multiple receive antennas at the receiver is a kind of an advanced receiver.

It should be noted that the terms interference mitigation receiver, interference cancellation receiver, interference rejection receiver, interference aware receiver, interference avoidance receiver etc. are interchangeably used but they all belong to a category of an advanced receiver or an enhanced receiver. All these different types of advanced receiver improve performance by fully or partly eliminating the interference arising from at least one interfering source. The embodiments disclosed herein are applicable for any type of advanced receiver used in the wireless device 10 or any type of a radio network node e.g. base station, LMU or any measuring node 12 (including RRU, RRH, relay, sensor, etc.).

Interference cancellation or suppression by such advanced receiver structures can lead to the elimination of the interference, in which case the interference is completely cancelled, whereas in other cases the impact of interference on the useful signal is reduced.

The advanced receiver can be used for receiving any one or more types of physical signal, e.g. SRS, Demodulation reference signal (DMRS), reference signal in general, etc in a radio node in LTE, or physical channel, e.g. PUCCH, PUSCH, Physical Random Access Channel TRACK etc. in radio node in LTE. The advanced receiver may be used for performing a specific type of measurements e.g. received signal strength or received signal quality, timing measurements in general, e.g., RTT, UL RTOA by LMU, Timing Advance (TA) Type 1, TA Type 2, and BS Rx-Tx time difference by the eNode B in LTE, directional measurements, e.g., AoA, single- or two-directional measurements, e.g., UE Rx-Tx, eNB Rx-Tx, RTT involve both DL and UL measurement components, etc.

Figure 8:
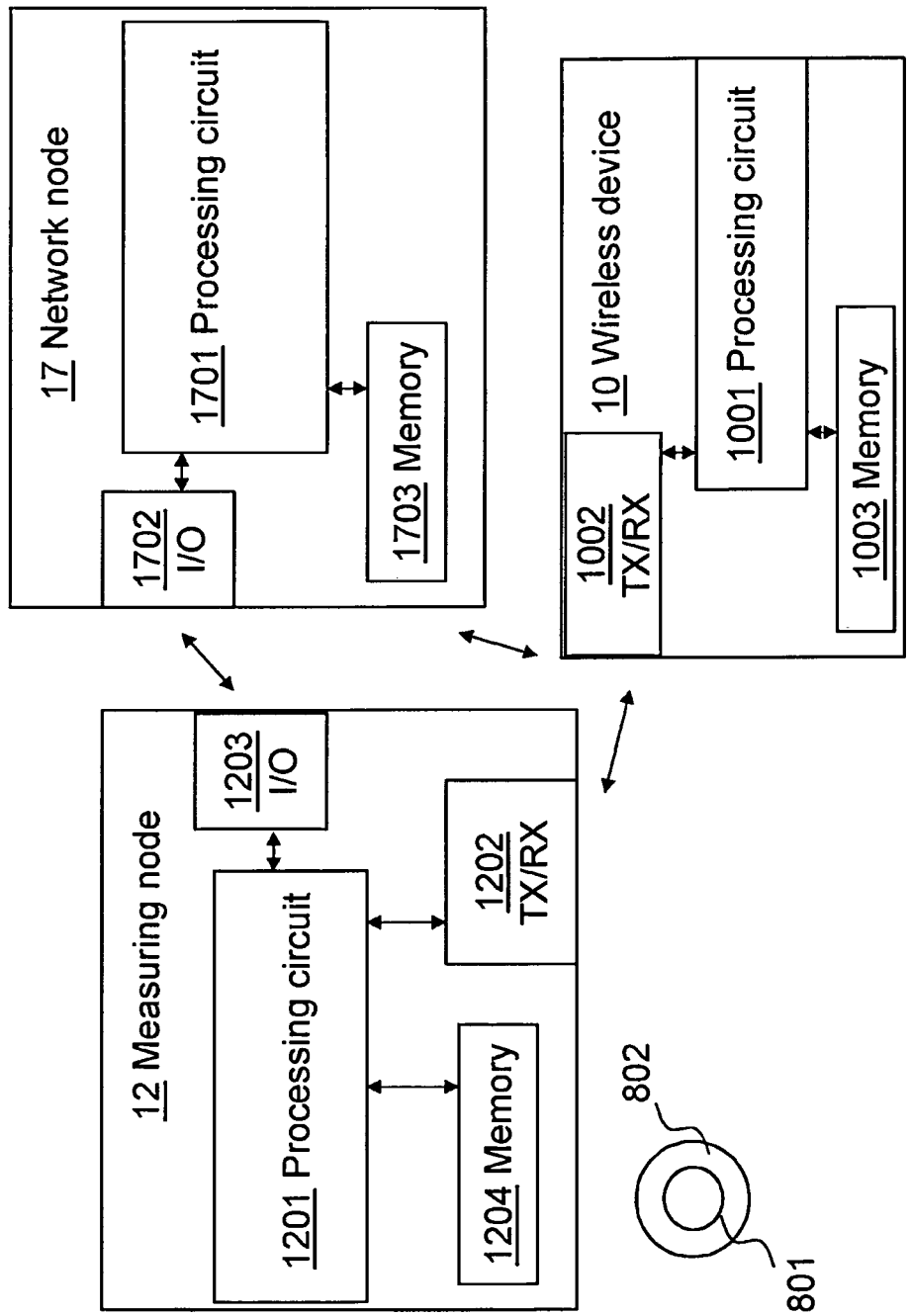
FIG. 8: is a block diagram depicting nodes according to some embodiments herein

FIG. 8 is a block diagram depicting the network node 17, the measuring node 12 and the wireless device 10. The embodiments herein for taking the MPR or enabling the MPR to be taken into account during positioning or making positioning measurements may be implemented through one or more processors, such as a processing circuit 1701 in the network node 17, a processing circuit 1201 in the measuring node 12 and/or a processing circuit 1001 in the wireless device 10 depicted in FIG. 8, together with computer program code for performing the functions and/or method steps of the embodiments herein. The program code mentioned above may also be provided as a computer program product, for instance in the form of a data carrier carrying computer program code for performing embodiments herein when being loaded into the network node 17, the measuring node 12, and/or the wireless device 10. One such carrier may be in the form of a CD ROM disc. It is however feasible with other data carriers such as a memory stick. The computer program code may furthermore be provided as pure program code on a server and downloaded to the network node 17, the measuring node 12 and/or the wireless device 10.

Each of the nodes then comprises communication interfaces such as input/out (I/O) 1702 in the network node 17, a transmitter/receiver (TX/RX) 1202 in the measuring node 12. The measuring node 12 may further comprise a input/output 1203. The wireless device 10 comprises e.g. a transmitter/receiver 1002.

Each of the node then also comprises a memory 1703 in the network node 17, a memory 1204 in the measuring node 12, and a memory 1003 in the wireless device 10.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

According to some embodiments a computer program 801 is provided. The computer program may comprise instructions that when executed on a processor of the wireless device 10 causes the wireless device 10 to perform the methods herein. The computer program may comprise instructions that when executed on a processor of the network node 17 causes the network node 17 to perform the methods herein. The computer program may comprise instructions that when executed on a processor of the measuring node 12 causes the measuring node 12 to perform the methods herein. Embodiments further disclose a computer-readable storage medium 802, having stored thereon a computer program according to the above, Thus, the methods according to the embodiments described herein for the radio node 12 are respectively implemented by means of a computer program product or computer program, comprising instructions, i.e., software code portions, which, when executed on at least one processor, cause the at least one processor to carry out the actions described herein, as performed by the different nodes. The computer program product may be stored on a computer-readable storage medium. The computer-readable storage medium, having stored thereon the computer program, may comprise the instructions which, when executed on at least one processor, cause the at least one processor to carry out the actions described herein. In some embodiments, the computer-readable storage medium may be a non-transitory computer-readable storage medium.

Figure 9:
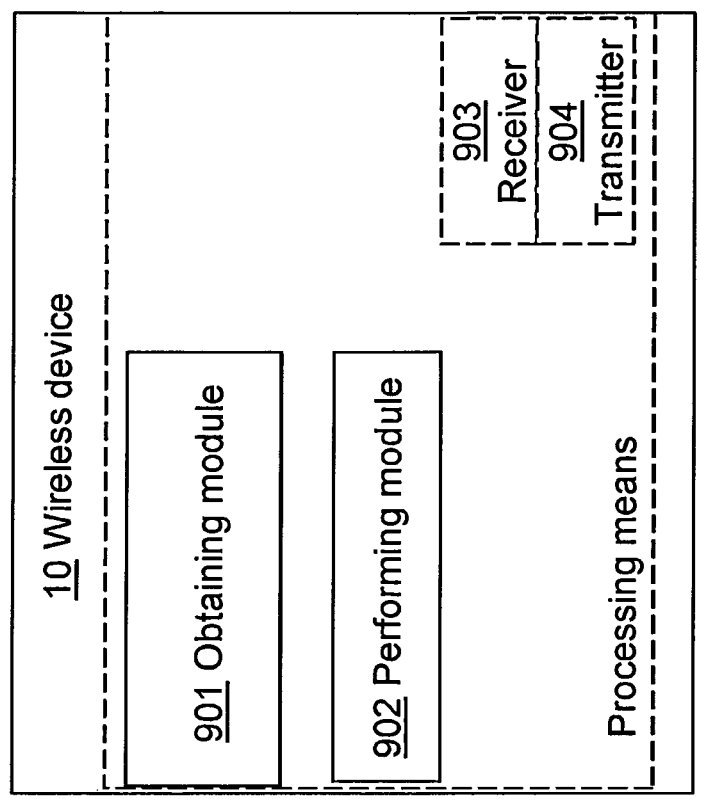
FIG. 9: A block diagram depicting a wireless device

In order to perform some methods disclosed herein a wireless device is provided. FIG. 9 shows some embodiments of the wireless device 10 for performing a positioning measurement procedure in the radio communications network. The positioning measurement procedure is performed using at least uplink transmitted signals from the wireless device 10.

The wireless device 10 comprises processing means that is configured to obtain information related to a maximum power reduction applied, or a maximum power reduction expected to be applied on uplink signals transmitted from the wireless device 10, which uplink signals are used for performing at least one positioning measurement. For example, the wireless device 10 may comprise an obtaining module 901 configured to obtain information related to a maximum power reduction applied, or a maximum power reduction expected to be applied on uplink signals transmitted from the wireless device 10. The wireless device 10 or the obtaining module 901 may be configured to obtain the information by explicitly receiving the information from a network node, such as an eNodeS, an LMU, a positioning node or similar.

The wireless device 10 or the processing means is configured to take the maximum power reduction applied, or the maximum power reduction expected to be applied into account when performing the positioning measurement procedure related to the at least one positioning measurement and/or a radio transmission procedure involving uplink radio signals transmitted by the wireless device 10 to enhance positioning measurement performance of the positioning measurement procedure. For example, the wireless device 10 may comprise a performing module 902 configured to take the maximum power reduction applied, or the maximum power reduction expected to be applied into account when performing the positioning measurement procedure related to the at least one positioning measurement and/or a radio transmission procedure involving uplink radio signals transmitted by the wireless device 10 to enhance positioning measurement performance of the positioning measurement procedure. The wireless device 10 or the performing module 902 may be configured, when performing the positioning measurement procedure and/or a radio transmission procedure, to perform at least one of:

- changing carrier frequency or frequency band used for the at least one positioning measurement procedure based on the maximum power reduction applied, or the maximum power reduction expected to be applied;
- using an enhanced measurement unit at the wireless device (10) based on the maximum power reduction applied, or the maximum power reduction expected to be applied;
- selecting and/or extending time interval and/or extending measurement bandwidth for the at least one positioning measurement procedure based on the maximum power reduction applied, or the maximum power reduction expected to be applied;
- selecting a radio access technology less impacted by the maximum power reduction than another radio access technology;
- dropping signals or carriers based on the maximum power reduction applied, or a maximum power reduction expected to be applied;
- obtaining samples more frequently when the maximum power reduction applied, or the maximum power reduction expected to be applied indicates a high maximum power reduction;
- stopping to perform an uplink measurement based on the maximum power reduction applied, or the maximum power reduction expected to be applied;
- informing a network node for reconfiguration of the at least one positioning procedure based on the maximum power reduction applied, or the maximum power reduction expected to be applied; and
- adapting the at least one positioning measurement procedure to a certain percentage or certain number of transmissions without maximum power reduction or a same maximum power reduction.

The wireless device 10, the processing means or the performing module 902 may be configured to take the maximum power reduction applied, or the maximum power reduction expected to be applied when: a condition is met; when the wireless device 10 is preconfigured to take the maximum power reduction into account; when receiving an explicit indication of the information from another node; upon determining that the maximum power reduction will be used; and/or when receiving an explicit request from a network node, such as a positioning node, eNodeB, LMU or similar. The wireless device 10, the processing means or the performing module 902 may be configure to meet one or more predefined requirements associated with positioning measurements which are performed on at least uplink signals transmitted by the wireless device (10) provided one or more condition related to maximum power reduction applied on said uplink transmitted signals is met.

The wireless device 10 may be configure to transmit to a network node, such as the measuring node 12 or the network node 17, a capability of adapting the at least one positioning measurement procedure depending on maximum power reduction and/or information related to the maximum power reduction applied, or a maximum power reduction expected to be applied on the uplink signals. For example, the wireless device 10 comprises a transmitter 904 that may be configured to transmit the capability.

The wireless device 10 may be configured to receive information about a transmission configuration of signals transmitted from the wireless device 10, and to use the received information for obtaining the maximum power reduction or a maximum power reduction expected to be applied on uplink signals transmitted by the wireless device 10. For example, the wireless device 10 comprises a receiver 903 that may be configured to receive the information of the transmission configuration, and the obtaining module 901 may be configured to use the received information. The received information may comprise at least one of: simultaneous transmission of Physical Uplink Shared Channel and Physical Uplink Control Channel, configuration of uplink carrier aggregation with or without multiple timing advance, time and/or frequency resources, modulation scheme, clustered or clustered transmissions. The information may be received from any of a positioning node or a network node.

Figure 10:
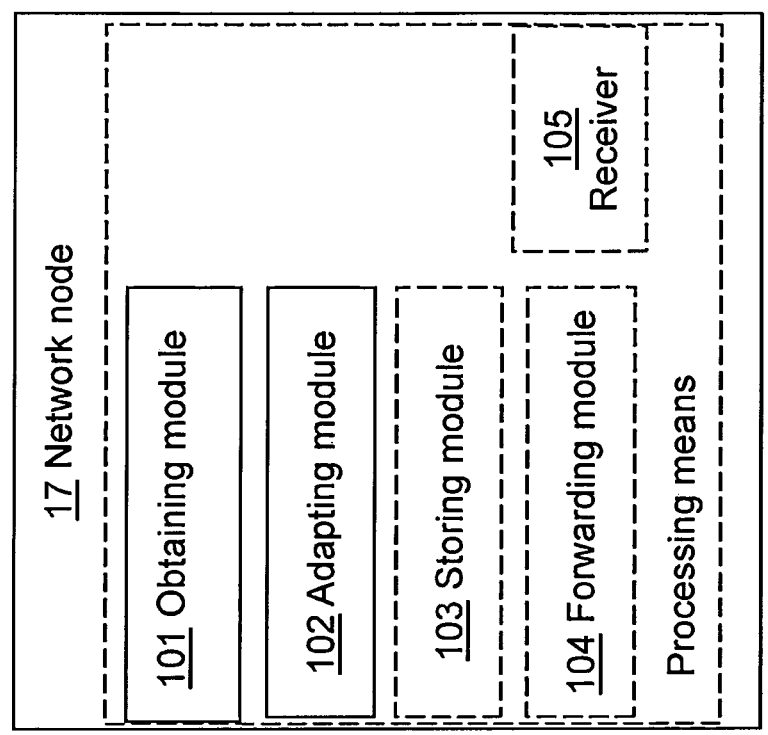
FIG. 10: A block diagram depicting a network node

In order to perform some methods disclosed herein a network node is provided. FIG. 10 shows some embodiments of the network node 17 for enabling positioning of the wireless device 10, and/or configuring the wireless device 10 and/or the measuring node 12 for performing a positioning measurement.

The network node 17 comprises processing means that is configured to obtain information related to a maximum power reduction applied, or a maximum power reduction expected to be applied on uplink signals transmitted by the wireless device 10, which are used by the wireless device 10 and/or measurement node 12 for performing at least one positioning measurement. For example, the network node 17 may comprise an obtaining module 101 configured to obtain the information. The network node 17 or the obtaining module 101 may be configured to obtain the information implicitly, explicitly, or from a combination of both. The network node 17, the processing means or the obtaining module 101 may be configured to obtain whether the measuring node 12 or the wireless device 10 is capable of adapting the at least one positioning measurement procedure depending on maximum power reduction.

The network node 17 or the processing means is further configured to adapt at least one positioning measurement procedure related to the at least one positioning measurement, based on the maximum power reduction applied, or the maximum power reduction expected to be applied, to enhance positioning performance. For example, the network node 17 may comprise an adapting module 102 configured to adapt the at least one positioning measurement procedure. The adaptation comprises one or more of: adapting parameters related to the at least one positioning measurement using uplink signals transmitted by the wireless device 10; switching to a positioning method which does not require a measurement on uplink signals transmitted by the wireless device 10; and discarding a positioning measurement that use uplink signals transmitted by the wireless device 10. The network node 17, the processing means or the adapting module 102 may be configured to adapt the at least one positioning measurement procedure when the maximum power reduction applied, or the maximum power reduction is expected to be applied is above a threshold. The adapting parameters may comprise to reconfigure the wireless device 10 to a configuration with less impact of the maximum power reduction. The network node 17, the processing means or the adapting module 102 may configured to decide whether to perform the adapting of the at least one positioning measurement procedure based on whether the wireless device 10 is capable of adapting or not.

The network node 17 or the processing means may be configured to store whether the measuring node 12 or the wireless device 10 is capable of adapting; and/or to forward whether the wireless device 10 is capable of adapting to the measuring node 12. For example, the network node 17 may comprise a storing module 103 configured to store whether the measuring node 12 or the wireless device 10 is capable of adapting, or a forwarding module 104 configured to forward whether the wireless device 10 is capable of adapting to the measuring node 12.

The network node 17 may be configured to receive information about a transmission configuration of signals transmitted from the wireless device 10, and to use the received information for obtaining the maximum power reduction or a maximum power reduction expected to be applied on uplink signals transmitted by the wireless device 10. For example, the network node may comprise a receiver 105 configured to receive the information of the transmission configuration, and the obtaining module 101 may be configured to use the received information. The received information may comprise at least one of: simultaneous transmission of Physical Uplink Shared Channel and Physical Uplink Control Channel, configuration of uplink carrier aggregation with or without multiple timing advance, time and/or frequency resources, modulation scheme, clustered or clustered transmissions. The information may be received from any of a network node or the wireless device 10, and/or the information may be transmitted to a measuring node 12 or the wireless device 10.

Figure 11:
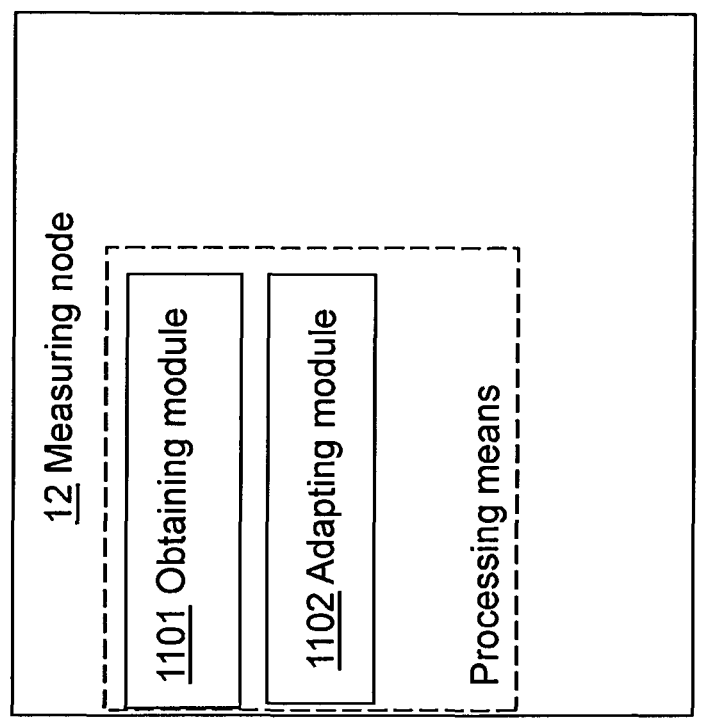
FIG. 11: A block diagram depicting a measuring node.

In order to perform some methods disclosed herein a measuring node is provided. FIG. 11 shows some embodiments of the measuring node 12 for performing a positioning measurement on at least uplink signals transmitted by a wireless device 10.

The measuring node 12 comprises processing means that is configured to obtain information related to a maximum power reduction applied, or a maximum power reduction expected to be applied on uplink signals transmitted by the wireless device 10. The uplink signals are used by the measuring node 12 for performing at least one positioning measurement. For example, the measuring node 12 may comprises an obtaining module 1101 configured to obtain the information. The information may be obtained from a network node 17 or the wireless device 10. The measuring node 12, the processing means or the obtaining module 1101 may be configured to obtain the information by receiving information about a transmission configuration of signals transmitted from the wireless device 10, and by using the received information for obtaining the maximum power reduction or a maximum power reduction expected to be applied on uplink signals transmitted by the wireless device 10. The received information may comprise at least one of: simultaneous transmission of Physical Uplink Shared Channel and Physical Uplink Control Channel, configuration of uplink carrier aggregation with or without multiple timing advance, time and/or frequency resources, modulation scheme, clustered or clustered transmissions. The information may be received from any of a positioning node, another network node 17 or the wireless device 10.

The measuring node 12 or the processing means is further configured to adapt at least one positioning measurement procedure related to the at least one positioning measurement to enhance positioning performance, based on the maximum power reduction applied, or the maximum power reduction expected to be applied. For example, the measuring node 12 may comprise an adapting module 1102 configured to adapt the at least one positioning measurement procedure.

The measuring node 12, the processing means, or the adapting module 1102 may be configured to adapt by: adapting a parameter and/or a procedure that relates to the measuring node 12; configuring the wireless device 10; or both.

The measuring node 12 or the processing means may be configured to obtain and to adapt by an autonomous decision of the measuring node 12, when receiving an explicit request from a network node, and/or according to a predefined rule.

Several embodiments are disclosed herein e.g.:

A method in the wireless device 10 for enhancing the performance of a positioning measurement on at least UL transmitted signals performed by a radio node, the method comprises:

Obtaining information related to the MPR applied, or expected to be applied on the uplink transmitted signals which are used by the radio node for performing at least one positioning measurement;

Adapting at least one procedure related to at least one positioning measurement and/or radio transmission procedure related to the UL radio signals, to enhance positioning performance or taking MPR into account when performing at least one positioning procedure related to at least one positioning measurement and/or transmitting the UL radio signals;

A method in the measuring node 12, e.g. LMU, eNB, BS, another wireless device, etc., configured to perform a positioning measurement on at least UL signals transmitted by the wireless device 10, the method comprises at least one of:

Obtaining information related to the MPR applied, or expected to be applied by the wireless device on its uplink transmitted signals which are used by the measuring node for performing at least one positioning measurement;

Adapting at least one positioning measurement procedure related to the at least one positioning measurement to enhance positioning performance;

A method in the network node 17, e.g., positioning node, eNB, a coordinating node, TCE or a node with MDT functionality, of determining position of the wireless device 10 and/or of configuring the measuring node 12 for performing positioning measurement, the method comprises:

Obtaining information related to the MPR applied, or expected to be applied by the wireless device on its uplink transmitted signals which are used by the wireless device and/or measurement node for performing at least one positioning measurement;

Adapting at least one positioning measurement procedure related to the at least one positioning measurement to enhance positioning performance, which adaptation may be, e.g., one or more of:

Adapting parameters related to the positioning measurement using at least UL signals transmitted by the wireless device Switching to a positioning method which does not require measurements on UL signals transmitted by the wireless device Fully or selectively discarding positioning measurements which use UL signals transmitted by the wireless device Embodiments herein may relate to a method in a network node (e.g., eNodeB)

obtaining the information about current or future positioning measurements based on UL radio signals transmitted by a wireless device, configuring MPR for the wireless device adaptively to the information about the current or future positioning measurements.

Methods of meeting at least one pre-defined requirement when MPR may be applied to UL transmissions used for positioning.

A method in a network node of serving a wireless device, the method comprises, obtaining the information that a positioning measurement is being performed by the wireless device and/or by a measuring node on UL radio signals transmitted by the wireless device, determining that the wireless device is applying or is expected to apply maximum power reduction on the uplink radio signals used for the positioning measurement, adapting one or more radio transmission procedures enabling reduction or avoidance of maximum power reduction that the wireless device need to apply on the uplink transmitted signals used for the positioning measurement.

The method above, wherein the radio transmission procedures comprises one or more of:

Configuring the wireless device with UL multi-antenna transmission

Configuring the wireless device to operate on a carrier and/or band which would require less or no MPR.

Scheduling UL data and/or control channel transmission on resource blocks and/or using transport format (e.g. modulation type/scheme and coding scheme) which lead to lower MPR for the wireless device's UL signals.

Controlling the network-configurable parameters related to output power

Configuring transmissions without multi-cluster transmissions during an UL positioning session.

Selecting and configuring a certain type of signals/channels for positioning to avoid or reduce MPR (e.g., avoid using PUSCH-based UL measurements which may cause increased MPR if the UE applies MPR)

Configuring transmission bandwidth to avoid MPR,

Scheduling UL transmissions in time and/or frequency resources with better propagation and/or interference conditions and thereby avoiding configuring MPR.

Adapting a power control scheme or at least one UL power control parameter for UL transmissions to avoid or minimize using MPR Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a wireless device for performing a positioning measurement procedure in a radio communications network, which positioning measurement procedure is performed using at least uplink transmitted signals from the wireless device, the method comprising:

obtaining information related to a maximum power reduction applied, or a maximum power reduction expected to be applied on uplink signals transmitted from the wireless device, which uplink signals are used for performing at least one positioning measurement; and taking the maximum power reduction applied, or the maximum power reduction expected to be applied into account when performing the positioning measurement procedure related to the at least one positioning measurement and/or a radio transmission procedure involving uplink radio signals transmitted by the wireless device to enhance positioning measurement performance of the positioning measurement procedure.

2. A method according to claim 1, wherein the obtaining comprises to receive information about a transmission configuration of signals transmitted from the wireless device, and to use the received information for obtaining the maximum power reduction or a maximum power reduction expected to be applied on uplink signals transmitted by the wireless device.

3. A method according to claim 1, wherein the performing comprises at least one of:

changing carrier frequency or frequency band used for the at least one positioning measurement procedure based on the maximum power reduction applied, or the maximum power reduction expected to be applied;

using an enhanced measurement unit at the wireless device based on the maximum power reduction applied, or the maximum power reduction expected to be applied;

selecting and/or extending time interval and/or extending measurement bandwidth for the at least one positioning measurement procedure based on the maximum power reduction applied, or the maximum power reduction expected to be applied;

selecting a radio access technology less impacted by the maximum power reduction than another radio access technology;

dropping signals or carriers based on the maximum power reduction applied, or a maximum power reduction expected to be applied;

obtaining samples more frequently when the maximum power reduction applied, or the maximum power reduction expected to be applied indicates a high maximum power reduction;

stopping to perform an uplink measurement based on the maximum power reduction applied, or the maximum power reduction expected to be applied;

informing a network node for reconfiguration of the at least one positioning procedure based on the maximum power reduction applied, or the maximum power reduction expected to be applied; and adapting the at least one positioning measurement procedure to a certain percentage or certain number of transmissions without maximum power reduction or a same maximum power reduction.

4. A method according to claim 1, wherein the maximum power reduction applied, or the maximum power reduction expected to be applied is taken into account when: a condition is met; when the wireless device is preconfigured to take the maximum power reduction into account; when receiving an explicit indication of the information from another node; upon determining that the maximum power reduction will be used; and/or when receiving an explicit request from a network node.

5. A method according to claim 1, further comprising
transmitting, to a network node, a capability of adapting the at least one positioning measurement procedure depending on maximum power reduction and/or information related to the maximum power reduction applied, or a maximum power reduction expected to he applied on the uplink signals.

6. A method according to claim 1, further comprises
meeting one or more pre-defined requirements associated with positioning measurements which are performed on at least uplink signals transmitted by the wireless device provided one or more condition related to maximum power reduction applied on said uplink transmitted signals is met.

7. A method in a network node for enabling positioning of a wireless device and/or configuring the wireless device and/or a measuring node for performing a positioning measurement, the method comprising
obtaining information related to a maximum power reduction applied, or a maximum power reduction expected to be applied on uplink signals transmitted by the wireless device which are used by the wireless device and/or measurement node for performing at least one positioning measurement; and adapting at least one positioning measurement procedure related to the at least one positioning measurement, based on the maximum power reduction applied, or the maximum power reduction expected to be applied, to enhance positioning performance, which adaptation comprises one or more of: adapting parameters related to the at least one positioning measurement using uplink signals transmitted by the wireless device; switching to a positioning method which does riot require a measurement on uplink signals transmitted by the wireless device; and discarding a positioning measurement that use uplink signals transmitted by the wireless device.

8. A method according to claim 7, wherein the adapting is performed when the maximum power reduction applied, or the maximum power reduction is expected to he applied is above a threshold.

9. A method according to claim 7, further comprising:
obtaining whether a measuring node or the wireless device is capable of adapting the at least one positioning measurement procedure depending on maximum power reduction.

10. A method according to claim 7, wherein the obtaining comprises to receive information about a transmission configuration of signals transmitted from the wireless device, and to use the received information for obtaining the maximum power reduction or a maximum power reduction expected to be applied on uplink signals transmitted by the wireless device.

11. A method in a measuring node for performing a positioning measurement on at least uplink signals transmitted by a wireless device, the method comprising
obtaining information related to a maximum power reduction applied, or a maximum power reduction expected to be applied on uplink signals transmitted by the wireless device, which uplink signals are used by the measuring node for performing at least one positioning measurement; and adapting at least one positioning measurement procedure related to the at least one positioning measurement to enhance positioning performance, based on the maximum power reduction applied, or the maximum power reduction expected to be applied.

12. A method according to claim 11, wherein the obtaining comprises to receive information about a transmission configuration of signals transmitted from the wireless device, and to use the received information for obtaining the maximum power reduction or a maximum power reduction expected to be applied on uplink signals transmitted by the wireless device.

13. A method according to claim 11 wherein the information is obtained from a network node or the wireless device.

14. A method according to claim 11, wherein the method is performed by an autonomous decision of the measuring node, when receiving an explicit request from a network node, and/or according to a predefined rule.

15. A wireless device for performing a positioning measurement procedure in a radio communications network, which positioning measurement procedure is performed using at least uplink transmitted signals from the wireless device, comprising processing means being configured to:
obtain information related to a maximum power reduction applied, or a maximum power reduction expected to be applied on uplink signals transmitted from the wireless device, which uplink signals are used for performing at least one positioning measurement; and to take the maximum power reduction applied, or the maximum power reduction expected to be applied into account when performing the positioning measurement procedure related to the at least one positioning measurement and/or a radio transmission procedure involving uplink radio signals transmitted by the wireless device to enhance positioning measurement performance of the positioning measurement procedure.

16. A wireless device according to claim 15, being configured to receive information about a transmission configuration of signals transmitted from the wireless device, and to use the received information for obtaining the maximum power reduction or a maximum power reduction expected to be applied on uplink signals transmitted by the wireless device.

17. A wireless device according to claim 15, wherein the processing means further being configured, when performing the positioning measurement procedure, to perform at least one of:
changing carrier frequency or frequency band used for the at least one positioning measurement procedure based on the maximum power reduction applied, or the maximum power reduction expected to be applied;

using an enhanced measurement unit at the wireless device based on the maximum power reduction applied, or the maximum power reduction expected to be applied;

selecting and/or extending time interval and/or extending measurement bandwidth for the at least one positioning measurement procedure based on the maximum power reduction applied, or the maximum power reduction expected to be applied;

selecting a radio access technology less impacted by the maximum power reduction than another radio access technology;

dropping signals or carriers based on the maximum power reduction applied, or a maximum power reduction expected to be applied;

obtaining samples more frequently when the maximum power reduction applied, or the maximum power reduction expected to be applied indicates a high maximum power reduction;

stopping to perform an uplink measurement based on the maximum power reduction applied, or the maximum power reduction expected to be applied;

informing a network node for reconfiguration of the at least one positioning procedure based on the maximum power reduction applied, or the maximum power reduction expected to be applied; and adapting the at least one positioning measurement procedure to a certain percentage or certain number of transmissions without maximum power reduction or a same maximum power reduction.

18. A wireless device according to claim 15, being configured to transmit to a network node, a capability of adapting the at least one positioning measurement procedure depending on maximum power reduction and/or information related to the maximum power reduction applied, or a maximum power reduction expected to be applied on the uplink signals.

19. A wireless device according to claim 15, wherein the processing means further being configured to meet one or more pre-defined requirements associated with positioning measurements which are performed on at least uplink signals transmitted by the wireless device provided one or more condition related to maximum power reduction applied on said uplink transmitted signals is met.

20. A network node for enabling positioning of a wireless device and/or configuring the wireless device and/or a measuring node for performing a positioning measurement, comprising processing means being configured to:

obtain information related to a maximum power reduction applied, or a maximum power reduction expected to be applied on uplink signals transmitted by the wireless device which are used by the wireless device and/or measurement node fix performing at least one positioning measurement; and adapt at least one positioning measurement procedure related to the at least one positioning measurement, based on the maximum power reduction applied, or the maximum power reduction expected to be applied, to enhance positioning performance, which adaptation comprises one or more of: adapting parameters related to the at least one positioning measurement using uplink signals transmitted by the wireless device; switching to a positioning method which does not require a measurement on uplink signals transmitted by the wireless device; and discarding a positioning measurement that use uplink signals transmitted by the wireless device.

21. A network node according to claim 20, wherein the processing means is configured to adapt the at least one positioning measurement procedure when the maximum power reduction applied, or the maximum power reduction is expected to be applied is above a threshold.

22. A network node according to claim 20, wherein the processing means further being configured to obtain whether a measuring node or the wireless device is capable of adapting the at least one positioning measurement procedure depending on maximum power reduction.

23. A network node according to claim 20, wherein the processing means further being configured to store whether the measuring node or the wireless device is capable of adapting; and/or to forward whether the wireless device is capable of adapting to the measuring node.

24. A network node according to claim 20, wherein the processing means is configured to obtain the information by receiving information about a transmission configuration of signals transmitted from the wireless device, and by using the received information for obtaining the maximum power reduction or a maximum power reduction expected to be applied on uplink signals transmitted by the wireless device.

25. A measuring node for performing a positioning measurement on at least uplink signals transmitted by a wireless device, comprising processing means being configured to:

obtain information related to a maximum power reduction applied, or a maximum power reduction expected to be applied on uplink signals transmitted by the wireless device, which uplink signals are used by the measuring node for performing at least one positioning measurement; and to adapt at least one positioning measurement procedure related to the at least one positioning measurement to enhance positioning performance, based on the maximum power reduction applied, or the maximum power reduction expected to be applied.

26. A measuring node according to claim 25, wherein the processing means being configured to obtain the information by receiving information about a transmission configuration of signals transmitted from the wireless device, and by using the received information for obtaining the maximum power reduction or a maximum power reduction expected to be applied on uplink signals transmitted by the wireless device.

27. A measuring node according to claim 25, wherein the information is obtained from a network node or the wireless device.

28. A measuring node according to claim 25, wherein the processing means being configured to obtain and adapt by an autonomous decision of the measuring node, when receiving an explicit request from a network node, and/or according to a predefined rule.

* * * * *

UNITED STATES PATENT AND TRADEMARK OFFICE
CERTIFICATE OF CORRECTION

PATENT NO. : 9,215,686 B2
APPLICATION NO. : 14/235586
DATED : December 15, 2015
INVENTOR(S) : Kazmi et al.

It is certified that error appears in the above-identified patent and that said Letters Patent is hereby corrected as shown below:

On the title page item (71), under "Applicant", in Column 1, Line 1, delete "Telefonaktiebolagel" and insert -- Telefonaktiebolaget --, therefor.

On Page 2, item (56), under "OTHER PUBLICATIONS", in Column 1, Line 2, delete "transmision" and insert -- transmission --, therefor.

In the specification,

In Column 2, Line 51, delete "itself," and insert -- itself. --, therefor.

In Column 4, Line 33, delete "the Si" and insert -- the S1 --, therefor.

In Column 4, Line 59, delete "protocol" and insert -- protocol. --, therefor.

In Column 6, Line 31, delete "infra-band" and insert -- intra-band --, therefor.

In Column 6, Line 63, delete "LMU etc," and insert -- LMU etc. --, therefor.

In Column 8, Line 23, delete "applied" and insert -- applied, --, therefor.

In Column 9, Line 3, delete "transmission vs," and insert -- transmission vs. --, therefor.

In Column 9, Line 19, delete "COMP etc." and insert -- CoMP etc. --, therefor.

In Column 10, Line 62, delete "SLP in LIE," and insert -- SLP in LTE, --, therefor.

In Column 11, Line 4, delete "e.g. RNC" and insert -- e.g., RNC --, therefor.

In Column 11, Line 13, delete "(P-GSW" and insert -- (P-GW --, therefor.

Signed and Sealed this
Twenty-sixth Day of July, 2016

Michelle K. Lee
*Director of the United States Patent and Trademark Office*

CERTIFICATE OF CORRECTION (continued)

U.S. Pat. No. 9,215,686 B2

In Column 12, Line 10, delete "I some" and insert -- In some --, therefor.

In Column 13, Line 17, delete "e.g. RRC." and insert -- e.g. RRC, --, therefor.

In Column 13, Line 38, delete "unavoidable," and insert -- unavoidable. --, therefor.

In Column 14, Line 63, delete "bands," and insert -- bands. --, therefor.

In Column 17, Line 40, delete "CDMA2000." and insert -- CDMA2000, --, therefor.

In Column 18, Line 13, delete "in LIE. FIG. 4 shows Multi-cluster UL transmission vs," and insert -- in LTE. FIG. 4 shows Multi-cluster UL transmission vs. --, therefor.

In Column 18, Line 41, after Equation, insert -- . --.

In Column 18, Line 43, delete "MPRϵ[3.0, 3.5 4.0" and insert -- MPRϵ[3.0 3.5 4.0 --, therefor.

In Column 19, Line 28, delete "section 62.5" and insert -- section 6.2.5 --, therefor.

In Column 19, Line 32, delete "$P_{CMAX\_L\_CA} \geq P_{CMAX} \geq P_{CMAX\_H\_CA}$" and insert -- $P_{CMAX\_L\_CA} \leq P_{CMAX} \leq P_{CMAX\_H\_CA}$ --, therefor.

In Column 20, Line 10, delete "MPR, total" and insert -- MPR, e.g., total --, therefor.

In Column 20, Line 22, delete "to it," and insert -- to it. --, therefor.

In Column 20, Line 36, delete "disclose" and insert -- disclose: --, therefor.

In Column 22, Line 10, delete "scale," and insert -- scale. --, therefor.

In Column 22, Line 22, delete "avowed MPR." and insert -- allowed MPR. --, therefor.

In Column 22, Line 59, delete "16QAM etc" and insert -- 16QAM, etc. --, therefor.

In Column 23, Line 45, delete "radio node." and insert -- radio node, --, therefor.

In Column 23, Line 49, delete "measurement," and insert -- measurement. --, therefor.

In Column 23, Line 57, delete "period," and insert -- period. --, therefor.

In Column 30, Line 10, delete "least ne" and insert -- least one --, therefor.

In Column 30, Line 29, delete "based on." and insert -- based on: --, therefor.

In Column 30, Line 44, delete "related 25" and insert -- related --, therefor.

In Column 32, Line 40, delete "and SCeil" and insert -- and SCell --, therefor.

In Column 33, Line 2, delete "according to 15" and insert -- according to --, therefor.

In Column 33, Line 14, delete "A-GLASS" and insert -- A-GNSS --, therefor.

In Column 34, Line 18, delete "Adapted by," and insert -- Adapted by --, therefor.

In Column 34, Line 28, delete "UL MEMO" and insert -- UL MIMO --, therefor.

In Column 36, Line 36, delete "channelsisignals" and insert -- channels/signals --, therefor.

In Column 37, Line 43, delete "period," and insert -- period. --, therefor.

In Column 38, Line 37, delete "procedures," and insert -- procedures. --, therefor.

In Column 38, Line 42, delete "thereof," and insert -- thereof. --, therefor.

In Column 39, Line 28, delete "25 operation," and insert -- operation, --, therefor.

In Column 39, Line 51, delete "5 MHz," and insert -- 5 MHz. --, therefor.

In Column 40, Line 4, delete "overheads," and insert -- overheads. --, therefor.

In Column 40, Line 44, delete "eNB-see" and insert -- eNB,-see --, therefor.

In Column 41, Line 8, delete "method," and insert -- method. --, therefor.

In Column 41, Line 12, delete "performance," and insert -- performance. --, therefor.

In Column 41, Line 16, delete "e.g. LMU;" and insert -- e.g. LMU, --, therefor.

In Column 41, Line 49, delete "TRACK" and insert -- (PRACH), --, therefor.

In Column 42, Line 13, delete "input/out" and insert -- input/output --, therefor.

In Column 42, Line 44, delete "above," and insert -- above. --, therefor.

In the claims,

In Column 49, Line 26, in Claim 5, delete "to he" and insert -- to be --, therefor.

In Column 49, Line 53, in Claim 7, delete "does riot" and insert -- does not --, therefor.

CERTIFICATE OF CORRECTION (continued)
U.S. Pat. No. 9,215,686 B2

In Column 49, Line 59, in Claim 8, delete "to he" and insert -- to be --, therefor.

In Column 51, Line 51, in Claim 20, delete "node fix" and insert -- node for --, therefor.